United States Patent
Hayashi et al.

(10) Patent No.: US 8,836,829 B2
(45) Date of Patent: Sep. 16, 2014

(54) IMAGING DEVICE AND IMAGING SYSTEM THAT CONVERTS A PIXEL BIT WIDTH DEPENDING ON AN OPERATION MODE

(75) Inventors: Hidetoshi Hayashi, Fujisawa (JP); Shintaro Takenaka, Yokohama (JP); Tatsuhiko Yamazaki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 13/459,454

(22) Filed: Apr. 30, 2012

(65) Prior Publication Data

US 2012/0314097 A1    Dec. 13, 2012

(30) Foreign Application Priority Data

Jun. 8, 2011  (JP) .................. 2011-128640

(51) Int. Cl.
*H04N 3/14*       (2006.01)
*H04N 9/07*       (2006.01)
*H04N 5/378*      (2011.01)

(52) U.S. Cl.
CPC . *H04N 5/378* (2013.01); *H04N 9/07* (2013.01)
USPC ....................................................... 348/294

(58) Field of Classification Search
USPC ....................................................... 348/294
See application file for complete search history.

(56) References Cited

U.S. PATENT DOCUMENTS

| 7,480,000 | B2 * | 1/2009 | Oda .............................. 348/321 |
| 8,023,002 | B2 | 9/2011 | Kinoshita et al. |
| 2009/0244303 | A1 * | 10/2009 | Kinoshita et al. .......... 348/218.1 |

FOREIGN PATENT DOCUMENTS

JP    2008-283331 A    11/2008

* cited by examiner

*Primary Examiner* — Gary C Vieaux
(74) *Attorney, Agent, or Firm* — Fitzpatrick, Cella, Harper & Scinto

(57) ABSTRACT

An imaging device comprising an imaging unit that outputs digital data of a pixel value indicating one of colors for each pixel and a conversion unit that outputs from ports I pieces of the digital data that has been input from the imaging unit in a first mode and output from part of the ports J (J<I) pieces of digital data obtained from the I pieces of the digital data of the same color that has been input from the imaging unit in a second mode is provided. When outputting digital data of pixels of a single row in the imaging unit in the both modes, the conversion unit outputs digital data of a first color from a first port and outputs digital data of a second color from a second port.

7 Claims, 23 Drawing Sheets

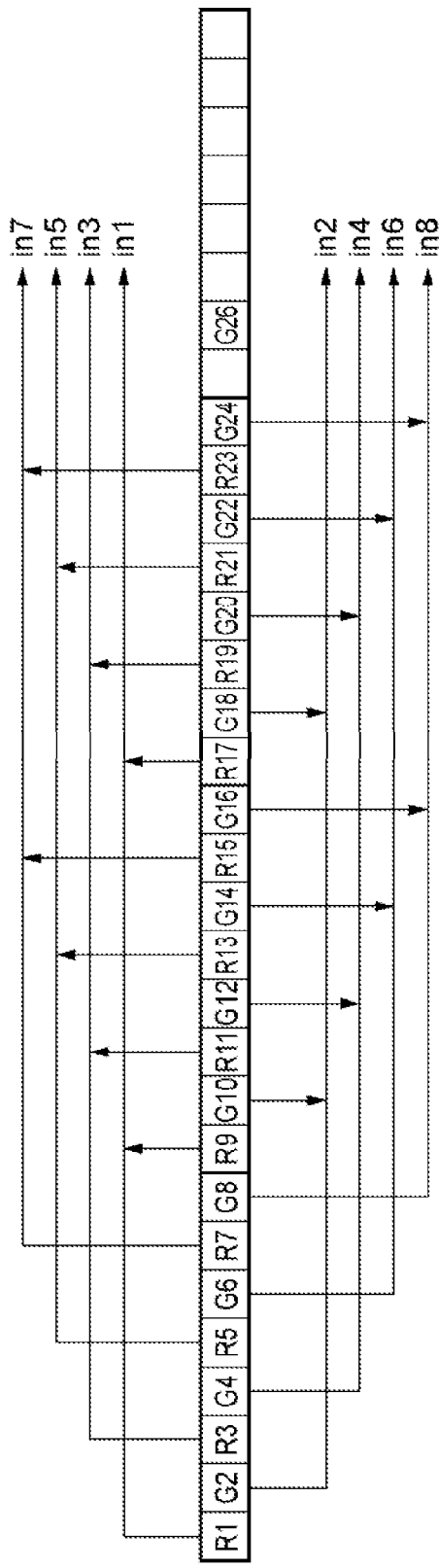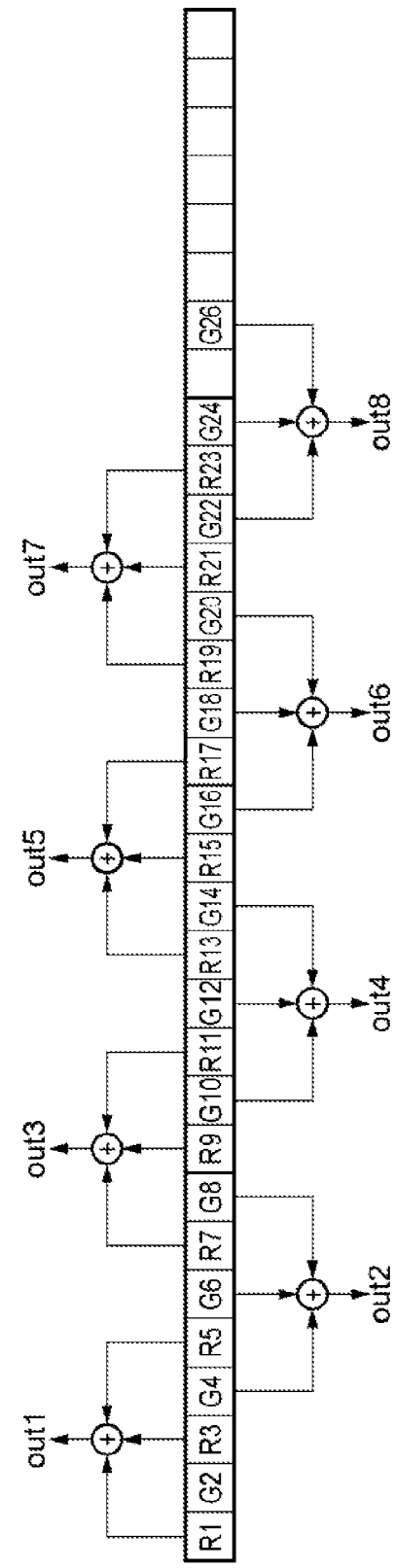

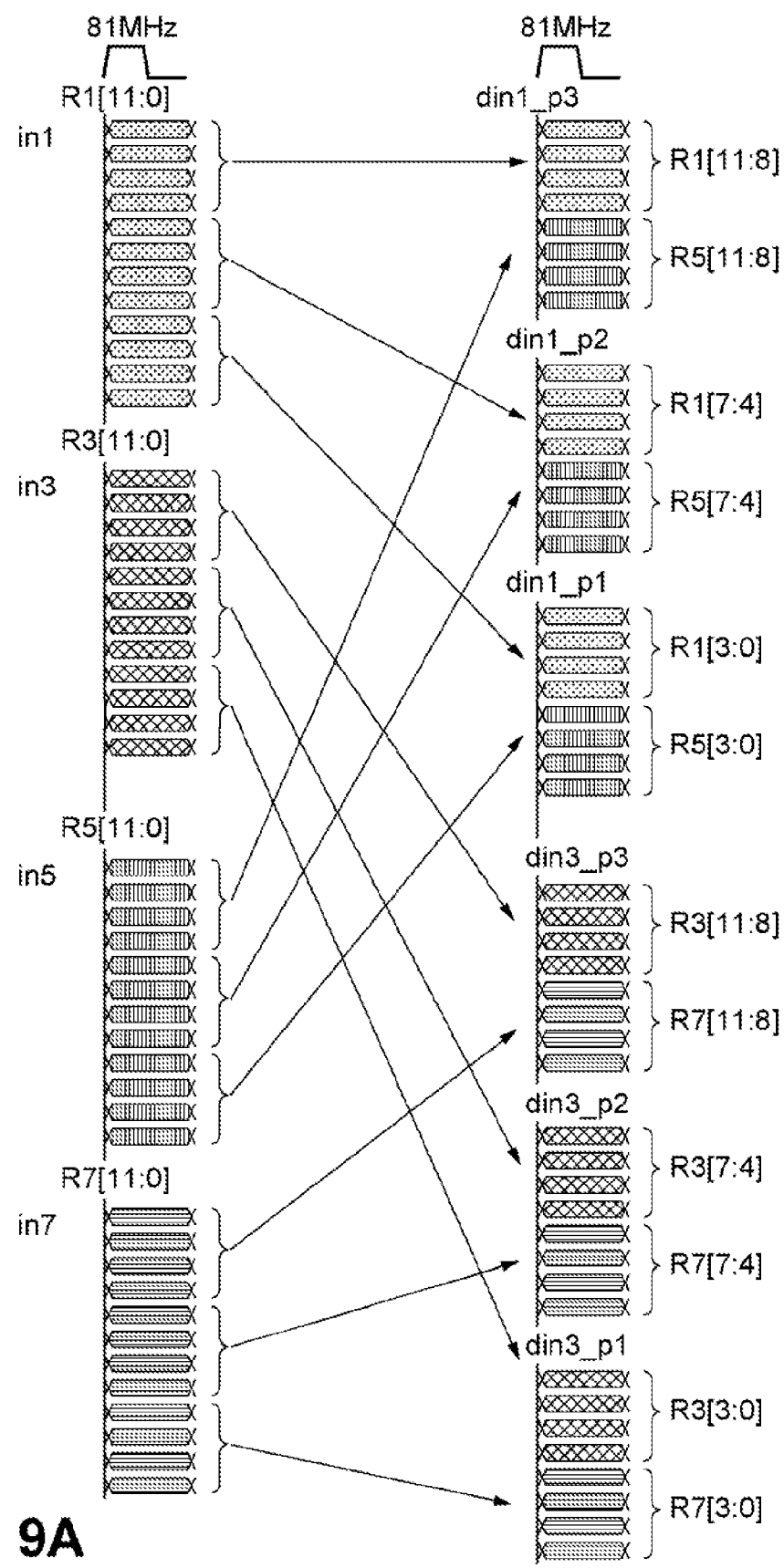
F I G. 9A

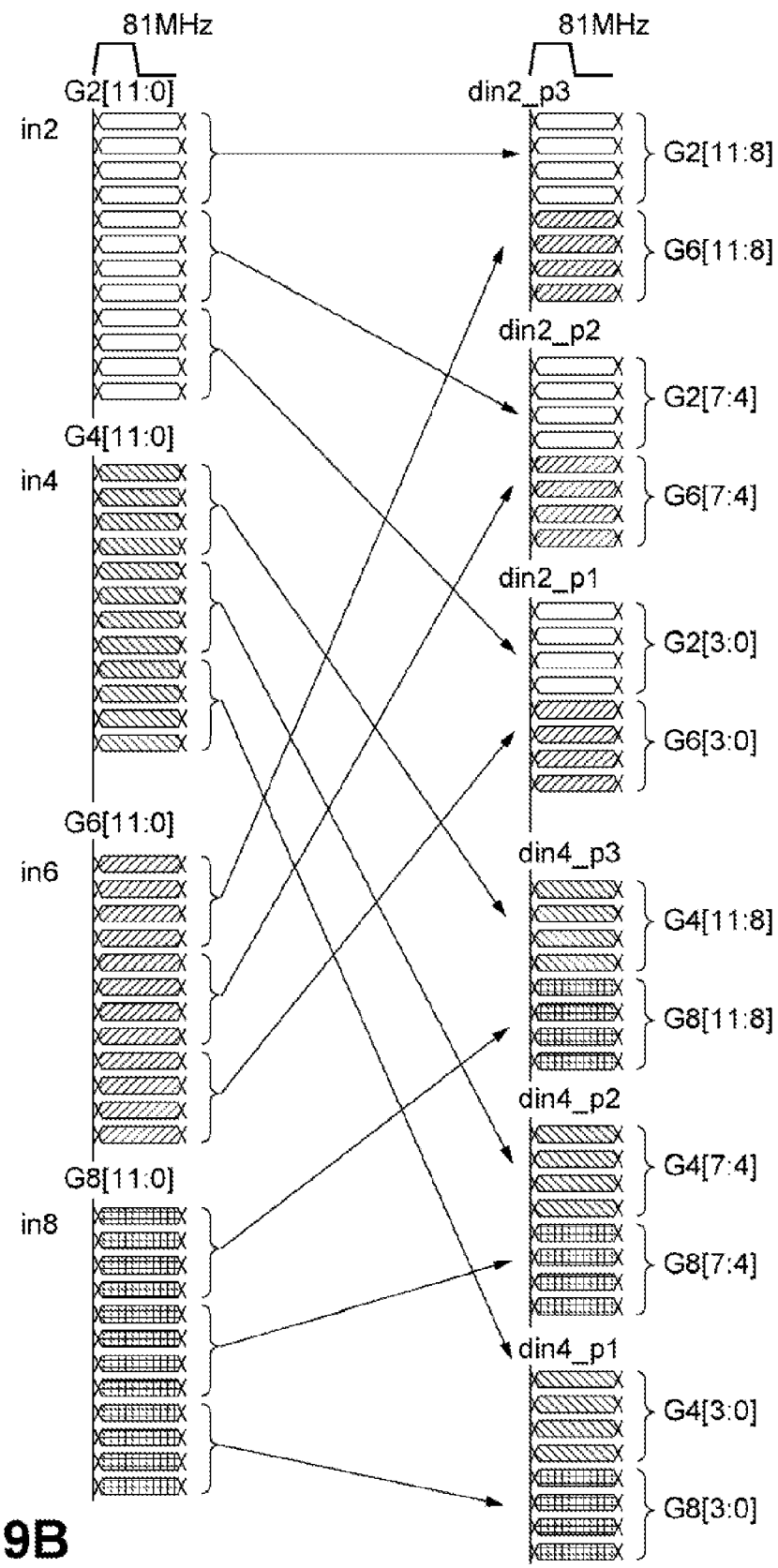
F I G. 9B

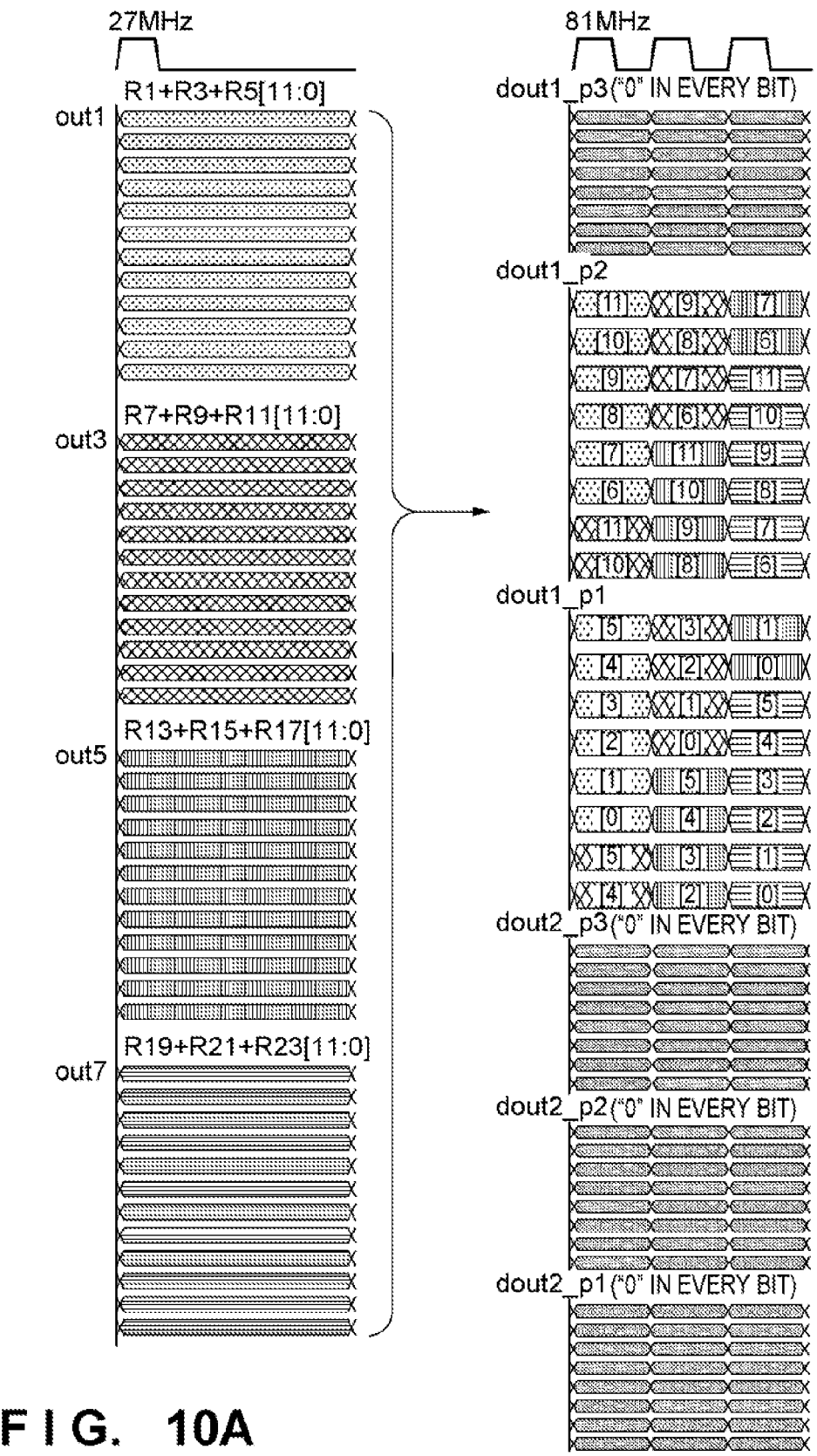
F I G. 10A

F I G. 13
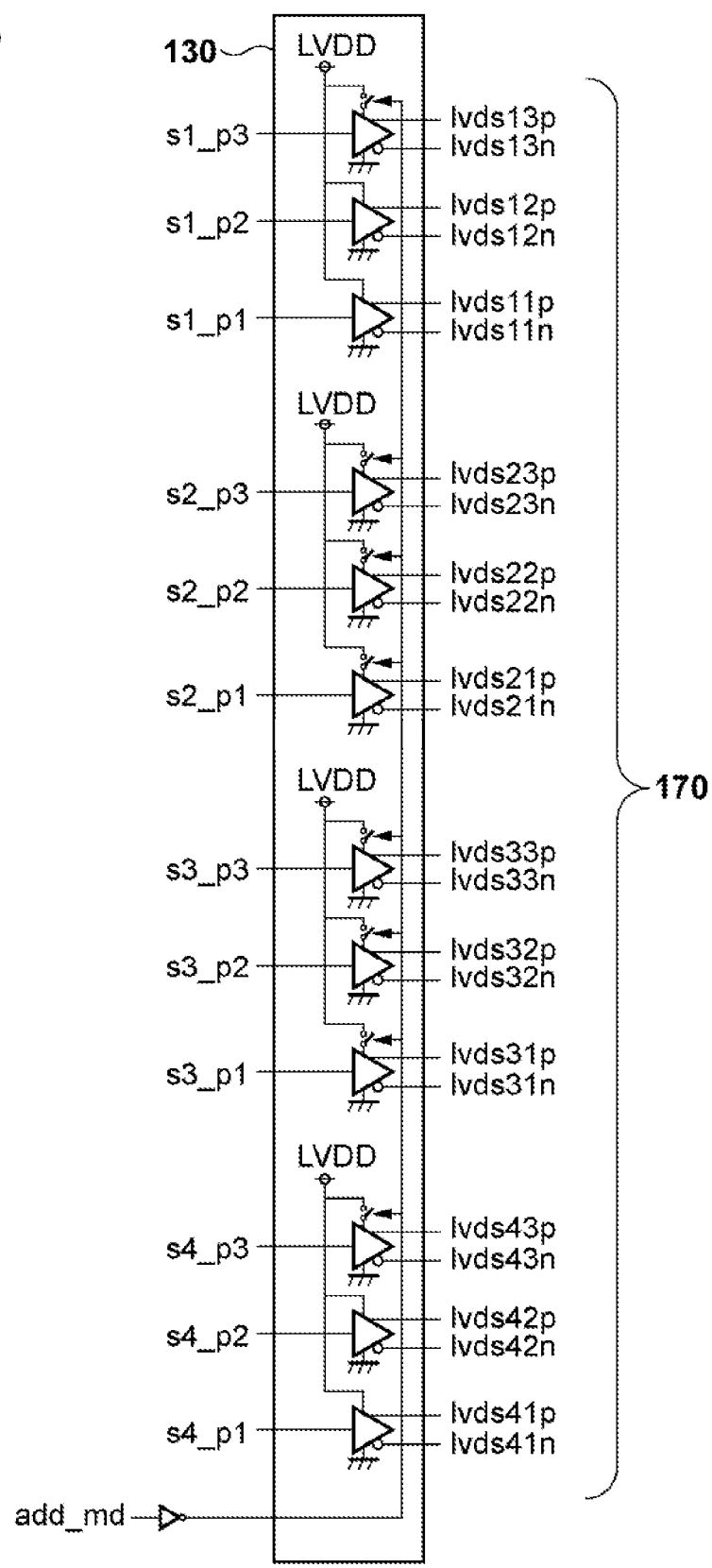

F I G. 15
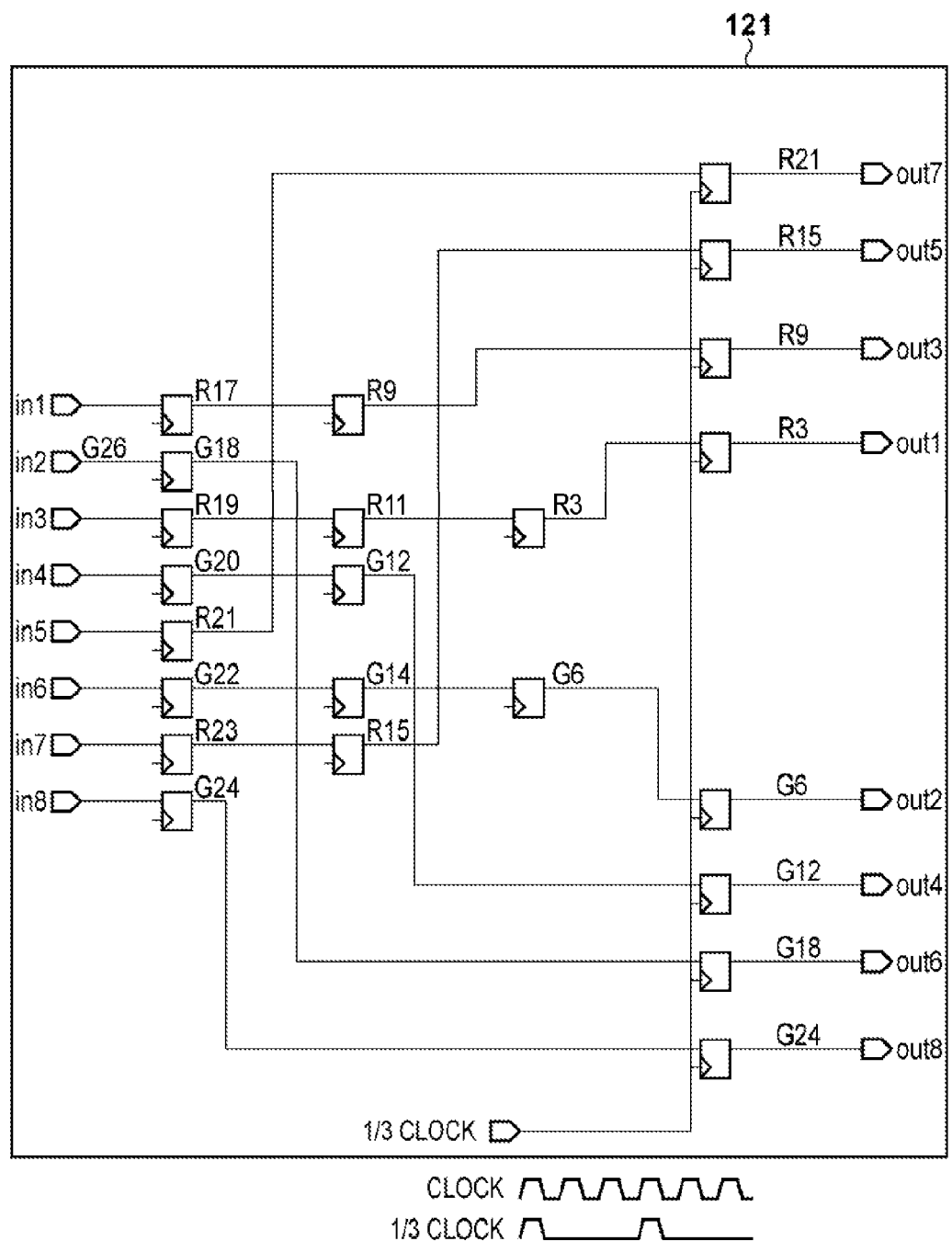

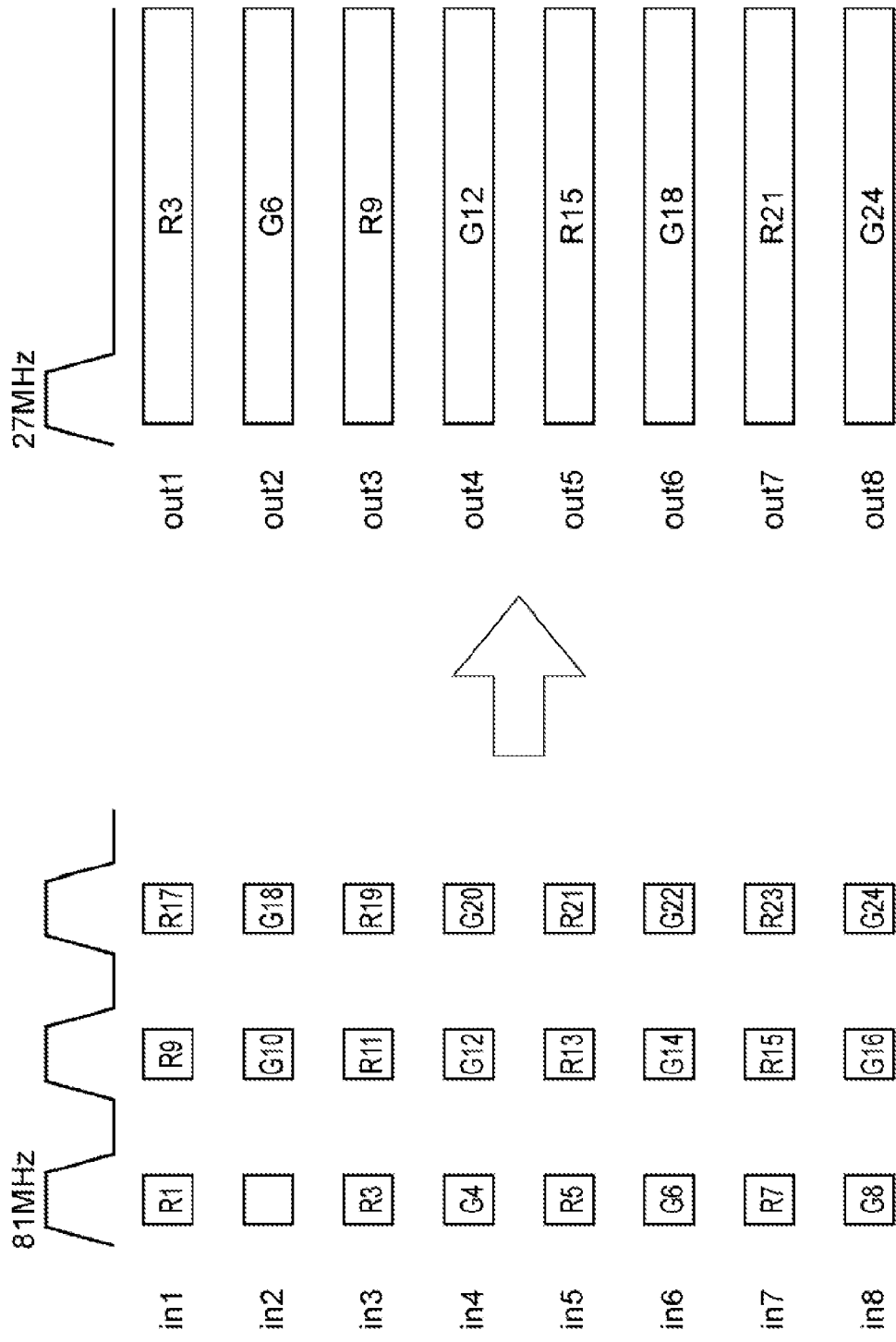

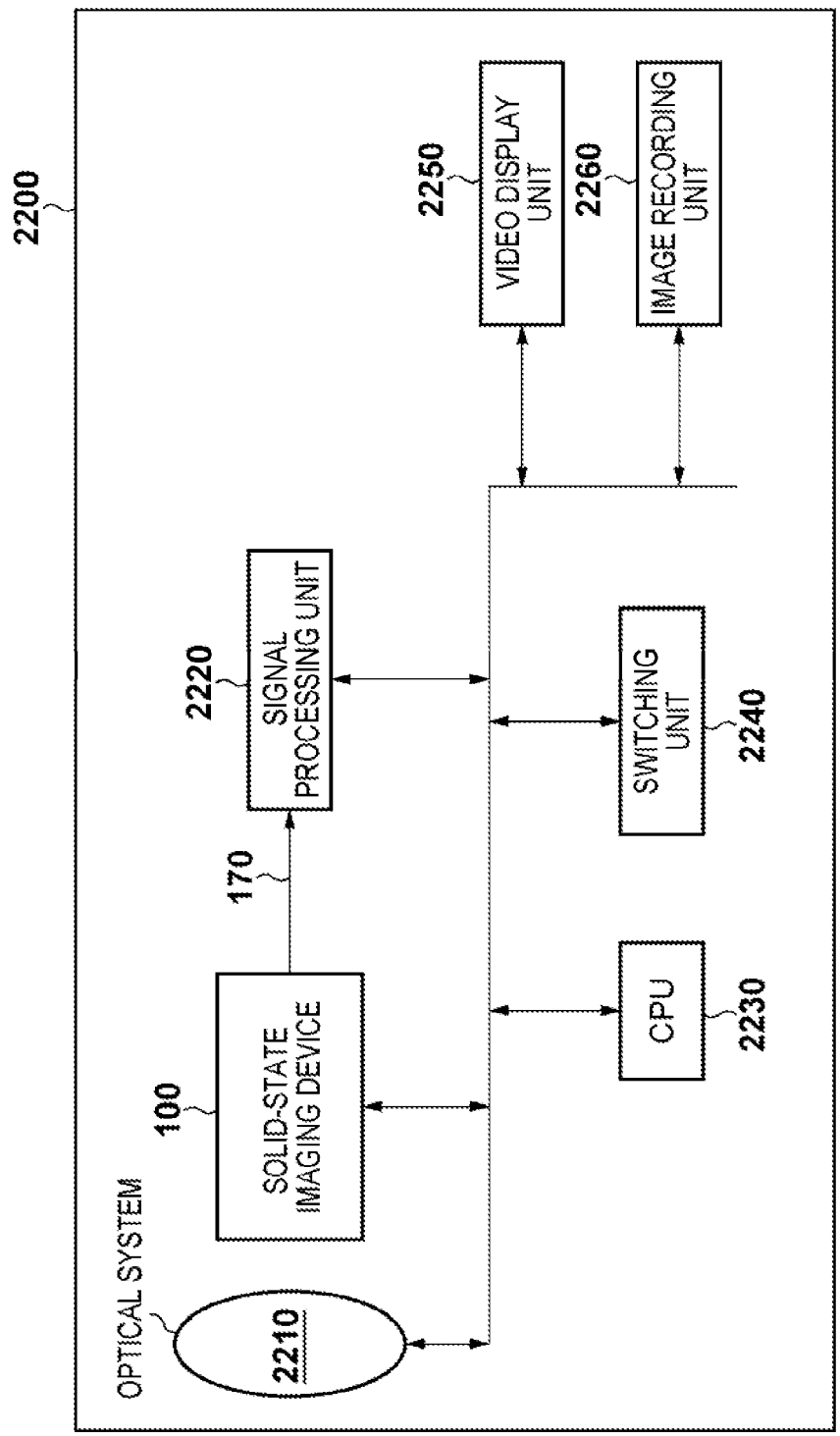

IMAGING DEVICE AND IMAGING SYSTEM THAT CONVERTS A PIXEL BIT WIDTH DEPENDING ON AN OPERATION MODE

BACKGROUND OF THE INVENTION

1. Field of the Invention

The present invention relates to an imaging device and an imaging system.

2. Description of the Related Art

Reducing power consumption is one issue for conventional imaging devices. In an imaging device driven by a rechargeable battery, this issue is highly important because the power consumption of the device affects the shooting time or number of images captured per battery charging. There are also other issues such as increasing the number of pixels in a solid-state image sensor and increasing the frame rate (increasing the readout rate). Improving the operating frequency of readout from solid-state image sensors for high-speed readout is followed by an increase in power consumption, and thus reducing power consumption and improving the frame rate are the conflicting issues. In the solid-state imaging device disclosed in Japanese Patent Laid-Open No. 2008-283331, in order to cope with both of the issues, the readout of pixel values from solid-state image sensors is shared and performed by a plurality of channels. This enables simultaneous readout of a plurality of pixels, thus allowing the device to be adapted to high-speed readout. Power consumption is further reduced by reducing the number of channels to be used for readout from solid-state image sensors, depending on the operation mode.

SUMMARY OF THE INVENTION

In the imaging device disclosed in Japanese Patent Laid-Open No. 2008-283331, the color of pixels to be read out from each channel varies depending on the operation mode. For example, referring to FIG. 10 in this document, there are two modes in reading out pixels in one row, namely a mode in which only signals indicating red are read out from Channel 1 and a mode in which both signals indicating red and signals indicating green are read out from Channel 1. In this way, if the color of pixels output from a single channel varies depending on the operation mode, the need arises to change the operation of a signal processing unit that processes signals received from the imaging device, depending on the operation mode, and accordingly the design of an imaging system becomes complicated. In view of this, an aspect of the present invention is to provide a technique for facilitating the design of a signal processing unit that processes signals received from an imaging device that has a plurality of operation modes.

An aspect of the present invention provides an imaging device comprising: an imaging unit configured to output, as digital data, a pixel value indicating one of a plurality of colors including a first color and a second color, for each of a plurality of pixels arranged in an array; and a conversion unit configured to output, from a plurality of ports, I pieces of the digital data that has been input from the imaging unit in a first mode, and output, from part of the plurality of ports, J (J<I) pieces of digital data obtained from the I pieces of the digital data of the same color that has been input from the imaging unit in a second mode, wherein the part of the ports includes a first port and a second port, and when outputting digital data of pixels of a single row in the imaging unit in the first mode and the second mode, the conversion unit outputs digital data of the first color from the first port and outputs digital data of the second color from the second port.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A and 6B are diagrams illustrating digital data that is input to a data conversion unit according to an embodiment of the present invention.

FIGS. 9A and 9B are diagrams illustrating exemplary processing performed by a second data conversion unit 123 according to an embodiment of the present invention.

FIGS. 10A and 10B are diagrams illustrating exemplary processing performed by a first data conversion unit 122 according to an embodiment of the present invention.

FIG. 13 is a diagram illustrating how to turn off some LVDS circuits in a compression mode according to an embodiment of the present invention.

FIG. 15 is a diagram illustrating another exemplary arrangement of the compression unit 121 according to an embodiment of the present invention.

FIG. 16 is a diagram illustrating the input and output rates of the compression unit 121 according to an embodiment of the present invention.

FIG. 17 is a diagram illustrating an exemplary arrangement of an imaging system 2200 according to an embodiment of the present invention.

DESCRIPTION OF THE EMBODIMENTS

Figure 1:
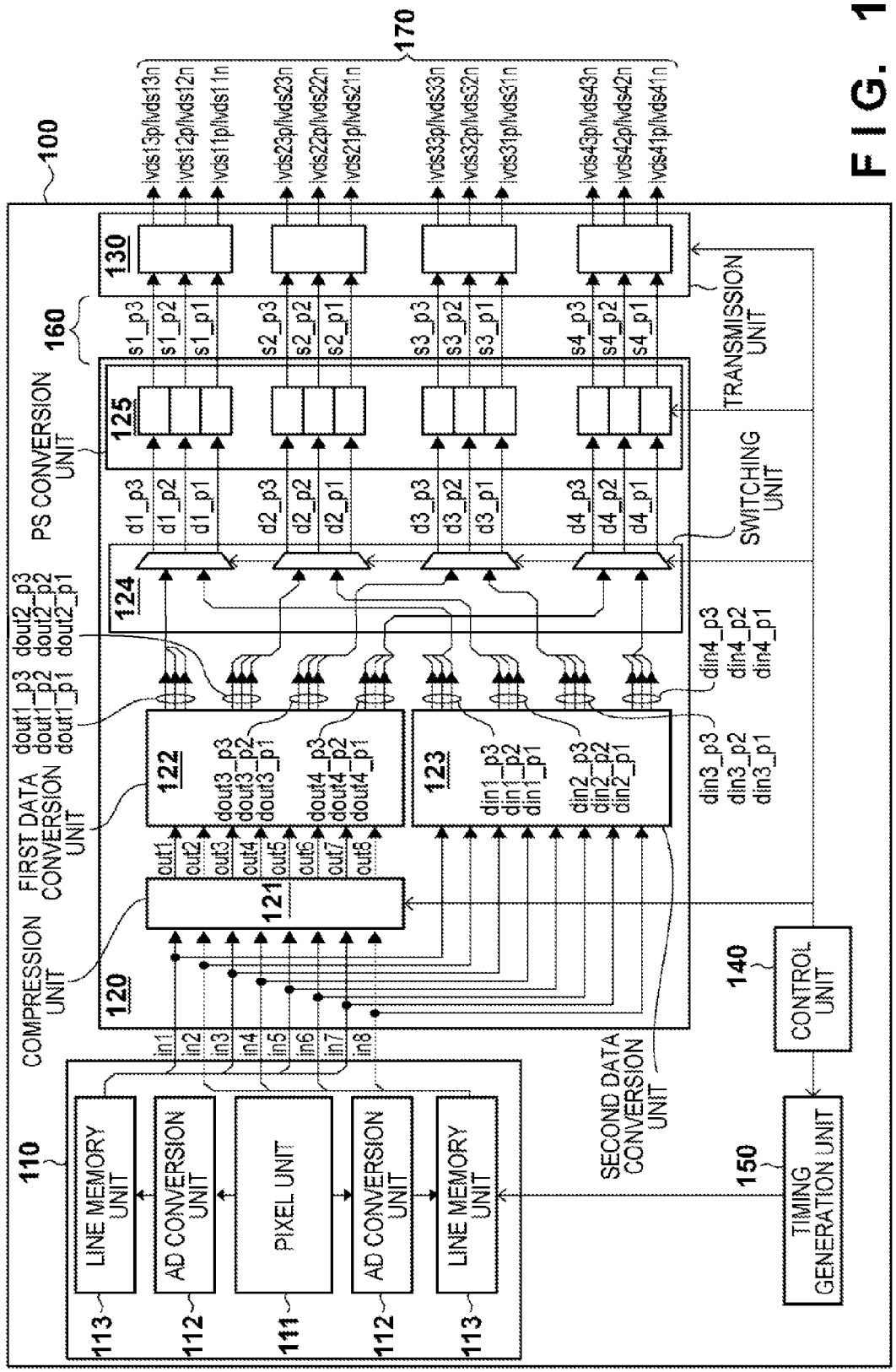
FIG. 1 is a diagram illustrating an exemplary overall arrangement of a solid-state imaging device 100 according to an embodiment of the present invention.

Various embodiments of the present invention will be described below with reference to the accompanying drawings. The following describes an exemplary overall arrangement of a solid-state imaging device 100 according to some embodiments with reference to FIG. 1. The solid-state imaging device 100 may include an imaging unit 110, a conversion unit 120, a transmission unit 130, a control unit 140, and a timing generation unit 150. Digital data indicating the pixel value of each pixel obtained by the imaging unit 110 is output to the conversion unit 120 as one of data pieces "in1" to "in8". In the present embodiment, the conversion unit 120 and the transmission unit 130 are connected by 12 signal lines 160. The conversion unit 120 converts the data output from the imaging unit 110 and outputs the converted data to the transmission unit 130 as 12 data pieces "s1_p1" to "s4_p3". The transmission unit 130 converts the transmission format of the data output from the conversion unit 120 and outputs the resultant to a signal line 170. The timing generation unit 150 generates the timing of supply to the imaging unit 110. The control unit 140 controls the overall operation of the solid-state imaging device 100. In particular, the solid-state imaging device 100 of the present embodiment is able to operate in two modes, namely a normal mode (first mode) and a compression mode (second mode), and the control unit 140 controls the mode in which the solid-state imaging device 100 operates. The normal mode is a mode in which the digital data of pixel values output from the imaging unit 110 is output as-is to a subsequent signal processing unit, and this mode is used when capturing high-resolution images such as still images, for example. On the other hand, the compression mode is a mode in which a single piece of digital data that represents a plurality of pieces of digital data indicating pixel values, which have been output from the imaging unit 110, is output to a subsequent signal processing unit. This compression mode is used, for example, when high-speed driving is necessary, such as when capturing moving images.

The imaging unit 110 may include a pixel unit 111, analog-to-digital (AD) conversion units 112, and line memory units 113. In the pixel unit 111, a plurality of pixels are arranged in an array, and the pixel value of each pixel is acquired as analog data. The AD conversion units 112 each convert the analog data acquired by the pixel unit 111 into digital data. The digital data output from the AD conversion units 112 is stored in the line memory units 113, and digital data of 8 pixels per clock is output to the conversion unit 120. In the present embodiment, a single piece of digital data consists of 12 bits. A bus that connects the imaging unit 110 and the conversion unit 120 has a bus width of 96 bits (=12 bits×8 pieces of data), and the bits of digital data transmitted from the imaging unit 110 to the conversion unit 120 are transmitted in parallel.

The conversion unit 120 may include a compression unit 121, a first data conversion unit 122, a second data conversion unit 123, a switching unit 124, and a parallel-to-serial (PS) conversion unit 125. The compression unit 121 outputs data pieces "out1" to "out8" (J pieces of P-bit parallel data) based on the data pieces "in1" to "in8" (I pieces of M-bit parallel data) output from the imaging unit 110. In some embodiments, the compression unit 121 generates a single piece of digital data by adding up a plurality of pieces of digital data indicating pixel values. Specifically, the compression unit 121 functions as an addition unit. This single piece of digital data represents the values of a plurality of pixels. Although in the present embodiment, a single piece of digital data is generated by simply adding up a plurality of pieces of digital data each indicating a pixel value, the method for processing a plurality of pieces of digital data is not limited to such addition. For example, an average value may be obtained by averaging a plurality of pieces of digital data, or a piece of digital data that has the largest or smallest value may be acquired as a representative value. In other words, it is sufficient for the method to be processing for obtaining a single piece of digital data that represents the values of a plurality of pixels, from among a plurality of pieces of digital data.

The first data conversion unit 122 converts the bit width of the eight data pieces "out1" to "out8" that have been output from the compression unit 121, and outputs the resultant data pieces as 12 data pieces "dout1_p1" to "dout4_p3". In the present embodiment, the data pieces "out1" to "out8" each consist of 12 bits, and the data pieces "dout1_p1" to "dout4_p3" each consist of 8 bits. The second data conversion unit 123 converts the bit width of the eight data pieces "in1" to "in8" that have been output from the imaging unit 110, and outputs the resultant data pieces as 12 data pieces "din1_p1" to "din4_p3". In the present embodiment, the data pieces "in1" to "in8" each consist of 12 bits, and the data pieces "din1_p1" to "din4_p3" each consist of 8 bits.

The switching unit 124 switches output in accordance with an instruction from the control unit 140. Specifically, when the solid-state imaging device 100 is operating in the compression mode, the switching unit 124 outputs the data pieces "dout1_p1" to "dout4_p3" that have been output from the first data conversion unit 122, as data pieces "d1_p1" to "d4_p3". When the solid-state imaging device 100 is operating in the normal mode, the switching unit 124 outputs the data pieces "din1_p1" to "din4_p3" that have been output from the second data conversion unit 123, as the data pieces "d1_p1" to "d4_p3". The PS conversion unit 125 converts the parallel data pieces "d1_p1" to "d4_p3" that has been output from the switching unit 124 into serial data pieces "s1_p1" to "s4_p3" and outputs these serial data pieces.

Figure 2:
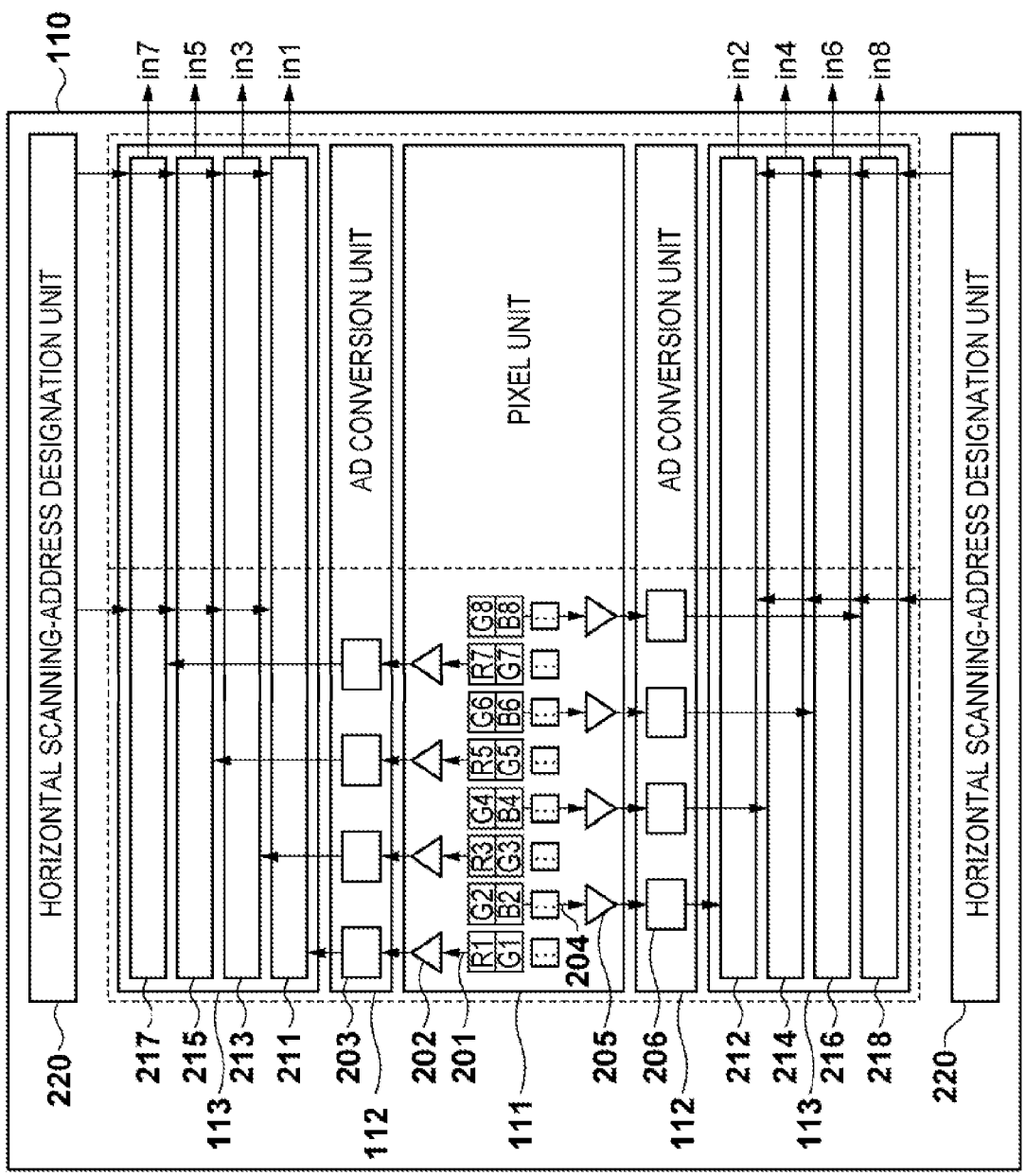
FIG. 2 is a diagram illustrating an exemplary arrangement of an imaging unit 110 according to an embodiment of the present invention.

The following describes details of the components described above in outline. Referring first to FIG. 2, the arrangement of the imaging unit 110 is described in further detail. In the pixel unit 111, pixels including photoelectric conversion elements are arranged in an array, and color filters are placed on the photoelectric conversion elements. As a result, a pixel value indicating one of a plurality of colors is read out from each of the pixels in the pixel unit 111. In FIG. 2, Bayer-pattern color filters are used as an example in which red (R) color filters and green (G) color filters are disposed alternately in a direction along the first row. Thus, the pixels in the first row are referred to respectively as R1, G2, and so on from the left side of FIG. 2. Although only pixels up to pixel G8 are shown in FIG. 2, pixels after pixel G8 are similarly disposed along that row. Similarly, green (G) color filters and blue (B) color filters are disposed alternately in a direction along the second row. Thus, the pixels in the second row are referred to respectively as G1, B2, and so on from the left side of FIG. 2. In the third row and onward, the array of the pixels in the first and second rows is repeated. For example, it is assumed that signals obtained from the pixels provided with the red color filters are referred to as red pixel values. The same follows for green and blue.

In the exemplary arrangement shown in FIG. 2, data of pixels located in odd-numbered columns from the left side of FIG. 2 is output to the AD conversion unit 112 disposed in the upper portion of the pixel unit 111, and data of pixels located in even-numbered columns is output to the AD conversion unit 112 disposed in the lower portion of the pixel unit 111. For example, a signal from the pixel R1 is output to a column amplifier 202 via a vertical signal line 201, amplified by the column amplifier 202, and output to an AD converter 203 as analog data. The AD converter 203 converts the analog data output from the column amplifier 202 into digital data and stores the digital data in a line memory 211. Similarly, a signal from the pixel G2 is output to a column amplifier 205 via a vertical signal line 204, amplified by the column amplifier 205, and output to an AD converter 206 as analog data. The AD converter 206 converts the analog data output from the column amplifier 205 into digital data and stores the digital data in a line memory 212. Hereinafter, unless particularly noted, the odd-numbered columns and the even-numbered columns are assumed to be counted from the left side of figures.

The line memory units 113 include eight line memories 211 to 218 in total that store digital data pieces indicating the values of pixels in the first to eighth columns, respectively. In a similar manner, digital data pieces indicating the values of pixels in the ninth and subsequent columns are also stored in one of the eight line memories 211 to 218. The imaging unit 110 may further include horizontal scanning-address designation units 220. The horizontal scanning-address designation units 220 output one row-worth of digital data of pixels stored in the line memory units 113, eight pieces at a time as the eight data pieces "in1" to "in8" through eight channels.

Figure 3:
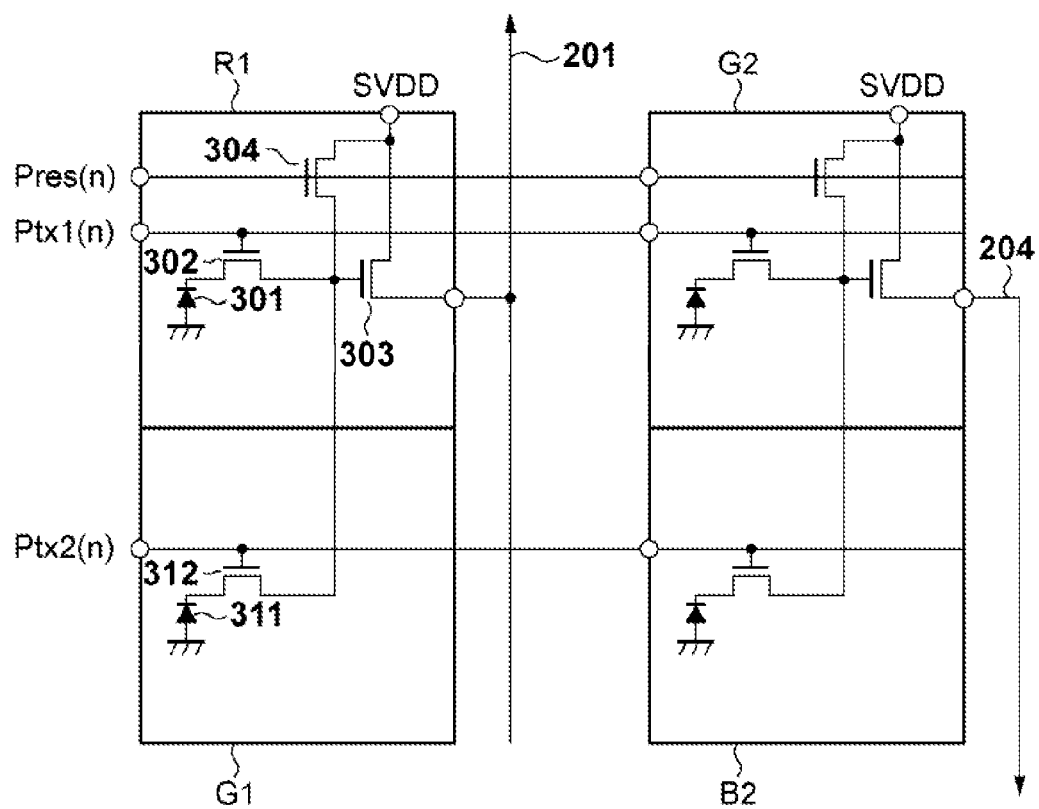
FIG. 3 is a diagram illustrating an exemplary circuit arrangement of pixels according to an embodiment of the present invention.

Now, an exemplary circuit arrangement of pixels included in the pixel unit 111 will be described with reference to FIG. 3. FIG. 3 is a diagram that focuses on the four pixels R1, G2, G1, and B2 in the upper left part of the pixel unit 111. Here, the pixel R1 is described as a representative of the pixels included in the odd-numbered rows, and the pixel G1 is described as a representative of the pixels included in the even-numbered rows. The pixel R1 includes a photoelectric conversion element (photodiode) 301 that performs photoelectric conversion in which an electric charge is generated in accordance with the amount of incident light. The electric charge obtained through the photoelectric conversion by the photoelectric conversion element 301 is held in a floating diffusion (FD) (not shown) via a transfer MOS transistor 302. The electric charge held in the FD is converted into a potential by the parasitic capacitance of the FD, and a signal that depends on the potential of the FD is amplified by an amplifying MOS transistor 303. The amplified signal appears in the vertical signal line 201. The pixel R1 further includes a reset MOS transistor 304 that resets the voltage of the FD to a predetermined voltage. The pixel G1 includes a photoelectric conversion element 311. An electric charge obtained through photoelectric conversion by the photoelectric conversion element 311 is supplied to the amplifying MOS transistor 303 via a transfer MOS transistor 312 and amplified by the amplifying MOS transistor 303. Although in FIG. 3, the amplifying MOS transistor 303 is shared between a pair of adjacent pixels located in a direction along columns, the present invention is not limited to this, and each of the pixels may include an amplifying MOS transistor.

Figure 4:
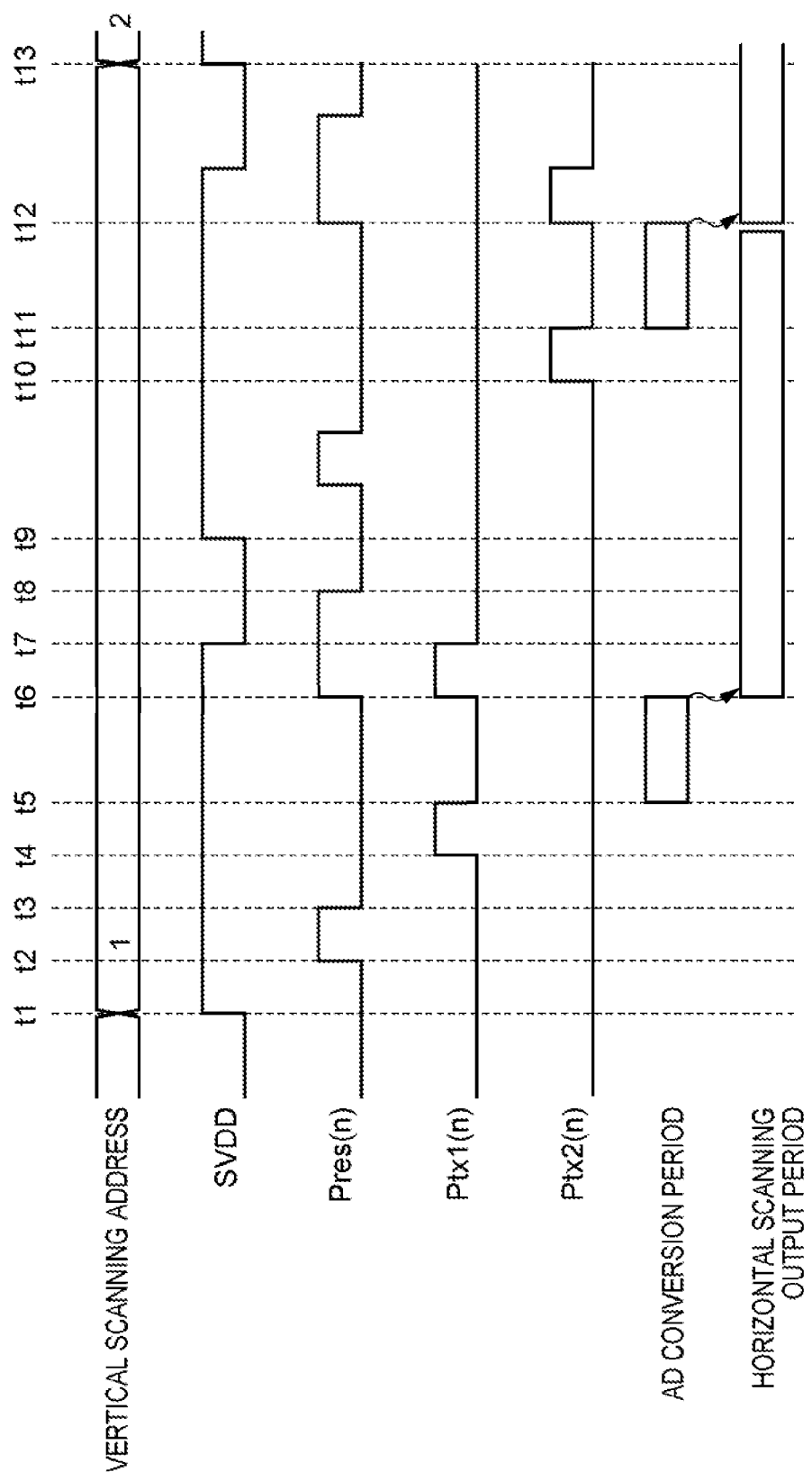
FIG. 4 is a diagram illustrating an exemplary operation of the imaging unit 110 according to an embodiment of the present invention.

An exemplary operation of the imaging unit 110 will be described with reference to a timing chart shown in FIG. 4. At time t1, the 1st address is selected by a vertical scanning-address designation unit (not shown in FIG. 3). When the 1st address has been designated, an argument n of the pulse becomes 1, and the values of pixels in the first row and the second row are read out. Furthermore, at time t1, the level of SVDDs shown in FIG. 3 is changed from a reference level (e.g., ground level) at which the amplifying MOS transistors 303 do not operate as amplifiers, to a VDD level. In the period from times t2 to t3, the reset MOS transistors 304 are in the ON state by switching Pres(1) from Low to High, and the VDD level is written to the FDs. By switching only the SVDDs of the 1st address (first and second rows) to the VDD level and holding the FDs of the other rows at the reference level, only the outputs from the amplifying MOS transistors 303 of the 1st address are output to the vertical signal lines 201 and 204.

In the period from times t4 to t5, Ptx1(1) that is connected to the gates of the transfer MOS transistors 302 in the upper row, namely the first row, of the 1st address is set to ON. As a result, the electric charges accumulated in the photoelectric conversion elements 301 are transferred to the FDs. Furthermore, signals that depend on the amounts of the transferred charges are read out to the vertical signal line 201 as voltage values by the amplifying MOS transistors 303 and are then output to the AD converters 203 via the column amplifiers 202. In the period from times t5 to t6, the AD converters 203 perform AD conversion.

At time t6, Pres(1) and Ptx1(1) are turned on again, and the photoelectric conversion elements 301 are reset. Furthermore, the digital data pieces of the first row that have been obtained by the AD conversion are sequentially designated by the horizontal scanning-address designation unit 220, as a result of which the data of the first row is read out. It is sufficient for this readout to be completed by the time (t12) that the AD conversion for the second row is completed. In the period from times t7 to t8, the SVDDs are set to the reference level and Pres(1) is switched to High, as a result of which the reference level is written to the photoelectric conversion elements 301. This prevents pixel output from the first row to the vertical signal lines 201 and 204.

At time t9, the SVDDs are changed again to the VDD level. Furthermore, Pres(1) is switched to High, and in the period from times t10 to t11, Ptx2(1) is turned on, as a result of which the values of the pixels in the second row are output to the vertical signal lines. At time t12, the photoelectric conversion elements 311 are reset, the reference level is written to the photoelectric conversion elements 311, and thereafter the processing for the second row ends. In the period from time t13 and onward, similar processing is performed by the vertical scanning-address designation unit designating the 2nd address.

Figure 5:
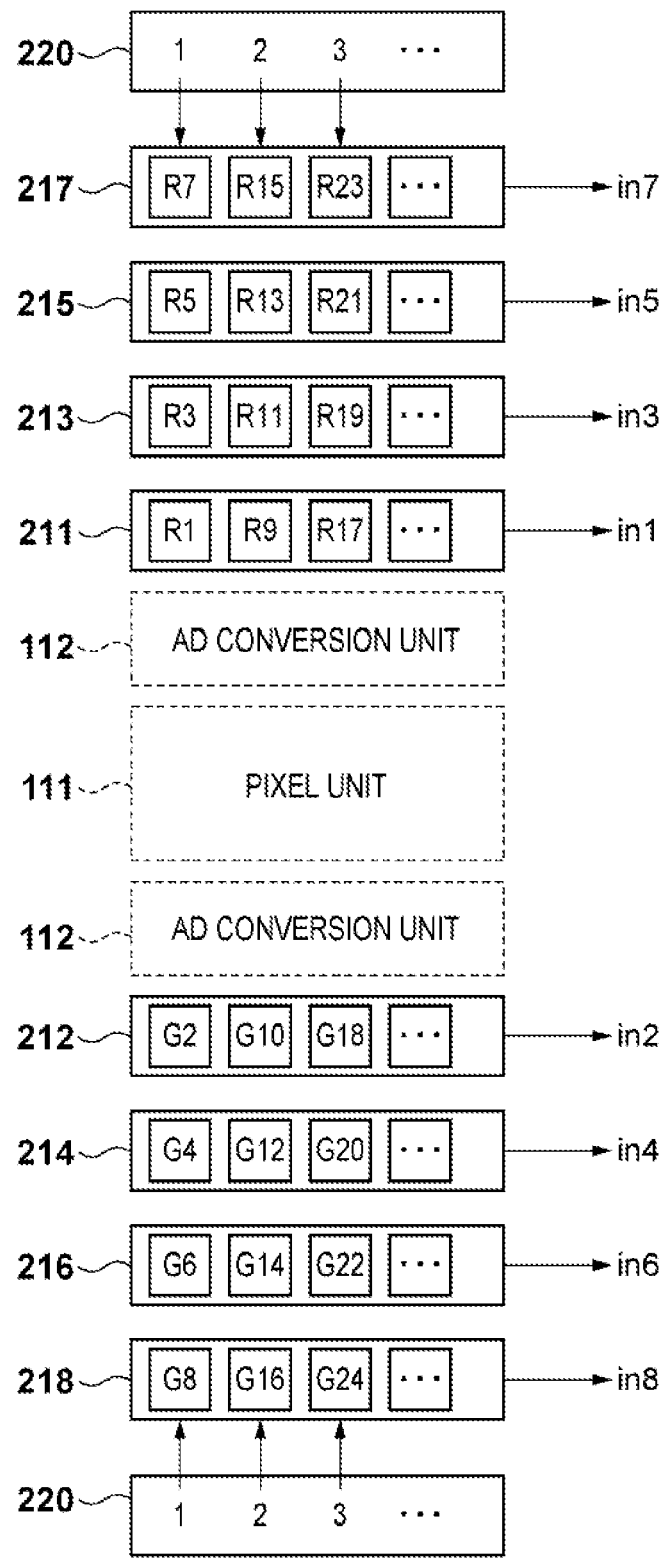
FIG. 5 is a diagram illustrating an exemplary state of line memory units 113 according to an embodiment of the present invention.

Now, the states of the line memory units 113 in which the digital data pieces indicating the values of the pixels in the first row are stored will be described with reference to FIG. 5. In FIG. 5, reference numeral R1 refers not to the pixel itself, but to the digital data piece indicating the pixel value for the pixel R1. As have been described with reference to the timing chart in FIG. 4, the digital data pieces indicating the values of the pixels in the first row are already stored in the line memory units 113 at time t6. As described previously, the line memory units 113 include the line memories 211 to 218, and the line memory 211 stores a digital data piece indicating, for example, the pixel R1 in the first column or a pixel R9 in the ninth column. In other words, the line memory 211 stores the pixel values in every eight columns starting from the pixel in the first column. The same follows for the other line memories 212 to 218. As described previously, a digital data piece indicating each pixel value consists of 12 bits. The horizontal scanning-address designation units 220 each output a single digital data piece from each line memory per clock, which is output from the timing generation unit 150. In other words, eight pieces of digital data are output per clock in parallel. For example, eight pieces of digital data indicating pixels R1, G2, . . . , and G8 are output in the first clock cycle. Although the case in which the digital data pieces output from the respective line memories are parallel data pieces is described in the present embodiment, those data pieces may be serial data pieces. Furthermore, in the present embodiment, it is assumed that the horizontal scanning-address designation units 220 output digital data at a rate of 81 MHz.

Now, digital data to be input to the first data conversion unit 122 and the second data conversion unit 123 will be described with reference to FIGS. 6A and 6B. FIG. 6A illustrates digital data to be input to the second data conversion unit 123. As shown in FIG. 1, the digital data pieces "in1" to "in8" output from the imaging unit 110 are input as-is to the second data conversion unit 123. For example, in the first clock cycle, the values of pixels R1 to G8 are input respectively as the digital data pieces "in1" to "in8" to the second data conversion unit 123. In the second clock cycle, the values of pixels R9 to G16 are input respectively as the digital data pieces "in1" to "in8" to the second data conversion unit 123.

FIG. 6B illustrates digital data to be input to the first data conversion unit 122. As shown in FIG. 1, the digital data pieces "out1" to "out8" output from the compression unit 121 are input to the first data conversion unit 122. In some embodiments, the compression unit 121 generates a single piece of digital data by adding up digital data pieces of three adjacent pixels of the same color. For example, the compression unit 121 outputs, as "out1", a digital data piece that is obtained by adding up three digital signals of the pixels R1, R3, and R5. In the present embodiment, for green pixels, in order to have equal pitches between the centers of mass of the added pixels, the addition of three pixels is started from the pixel G4 without using digital data of the pixel G2.

Figure 7:
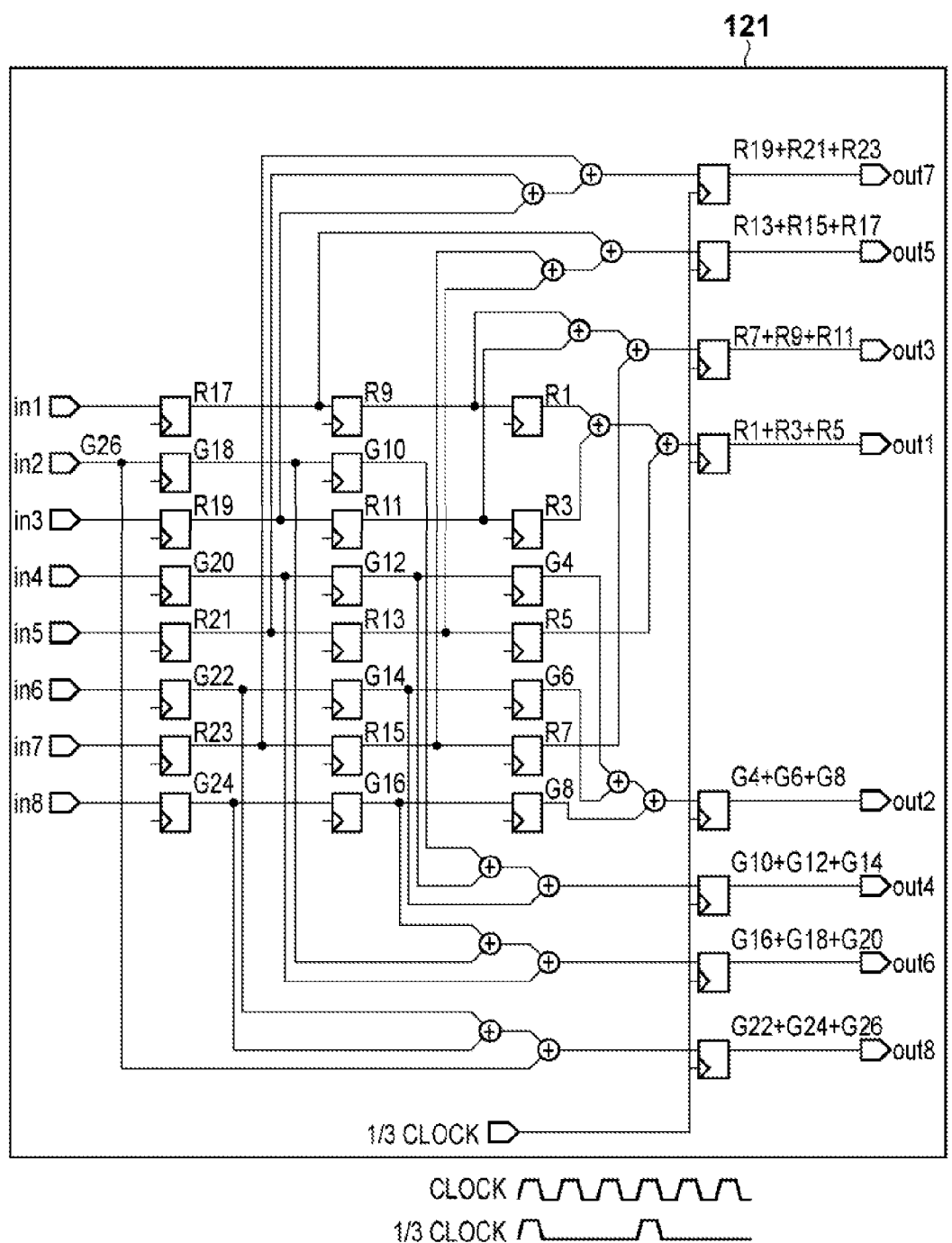
FIG. 7 is a diagram illustrating an exemplary arrangement of a compression unit 121 according to an embodiment of the present invention.

An exemplary arrangement of the compression unit 121 is described with reference to FIG. 7. As shown in FIG. 7, three clocks' worth of input is stored in each D flip-flop. Then, the compression unit 121 adds up three pieces of digital data stored in each D flip-flop so as to generate and output a single piece of digital data.

Figure 8:
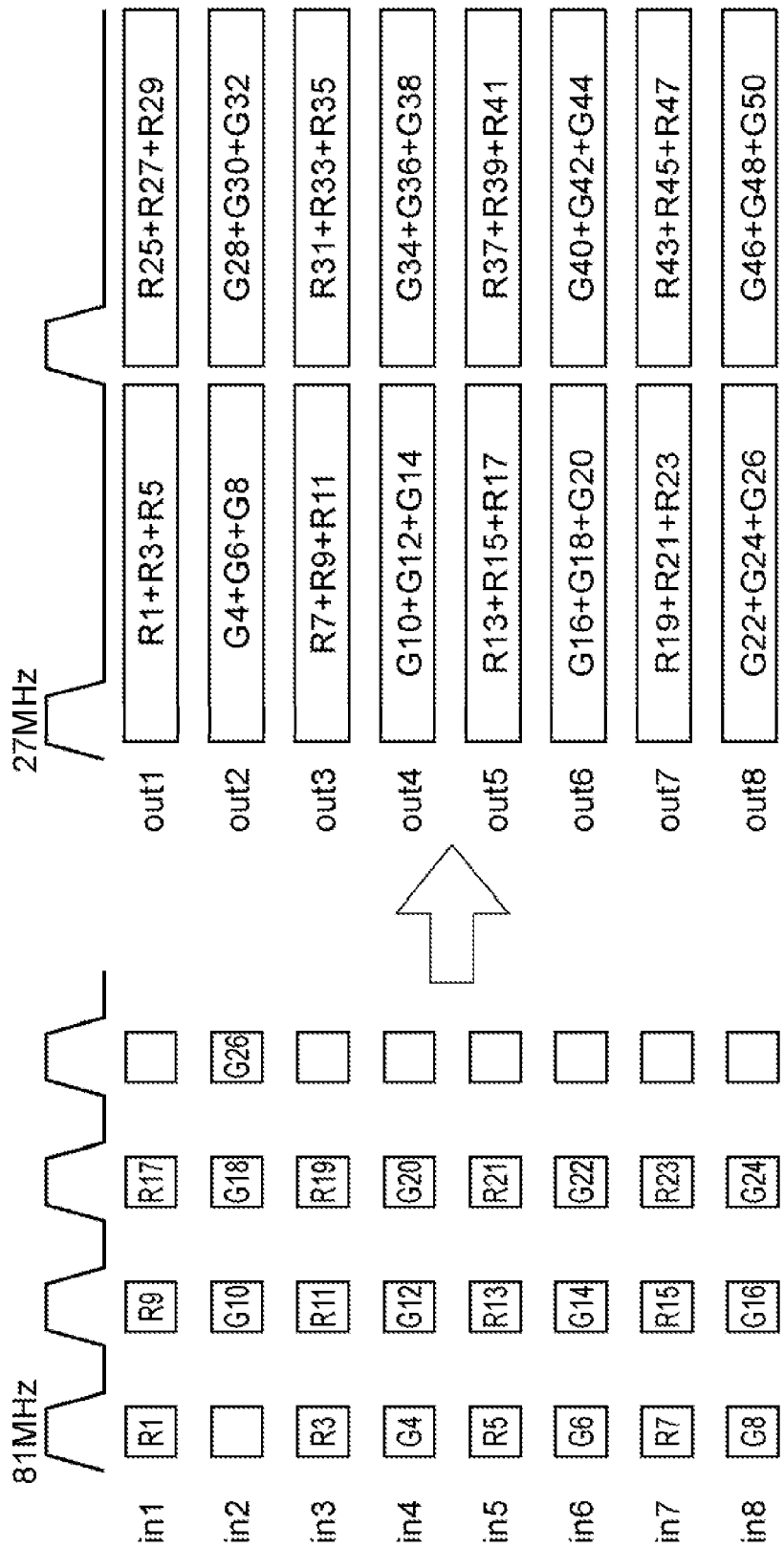
FIG. 8 is a diagram illustrating the input and output rates of the compression unit 121 according to an embodiment of the present invention.

The input and output rates of the compression unit 121 are described with reference to FIG. 8. The compression unit 121 receives input of eight pieces of digital data per clock. Since the compression unit 121 generates a single piece of digital data from three pieces of digital data, the number of digital data pieces is reduced to ⅓. In order to output eight pieces of digital data per clock from the compression unit 121, the output rate of the compression unit 121 may be one third the input rate of the compression unit 121. As described previously, the input rate of the compression unit 121 is 81 MHz, and thus the output rate of compression unit 121 is 27 MHz, which is one third the input rate.

Then, exemplary processing performed by the second data conversion unit 123 will be described with reference to FIGS. 9A and 9B. As described previously, the second data conversion unit 123 receives input of eight pieces of 12-bit parallel data per clock at a rate of 81 MHz. Thus, the second data conversion unit 123 converts the bit width of the input data into 8 bits and outputs 12 pieces of 8-bit parallel data per clock at a rate of 81 MHz. In the example shown in FIGS. 9A and 9B, the bits of the 12-bit digital data piece indicating the pixel R1, which has been input as "in1", are distributed four bits each to the higher order bits of the data pieces "din1_p1" to "din1_p3". Similarly, the bits of the 12-bit digital data indicating the pixel R5, which has been input as "in5", are distributed four bits each to the lower order bits of the data pieces "din1_p1" to "din1_p3". The conversion result is, for example, as follows:

din1_$p$3[7:0]={in1[11:8], in5[11:8]};

din1_$p$2[7:0]={in1[7:4], in5[7:4]}; and din1_$p$1[7:0]={in1[3:0], in5[3:0]}.

Here, for example, in1[11:8] represents a bit string of the 11th to 8th bits of the data piece "in1". Furthermore, { . . . } represents bit concatenation. The bits of the other pieces of 12-bit digital data are also distributed in the manner as shown in FIGS. 9A and 9B. In general, the second data conversion unit 123 generates Q pieces of P-bit parallel data by rearranging the bits of I pieces of M-bit parallel data.

Figure 10B:
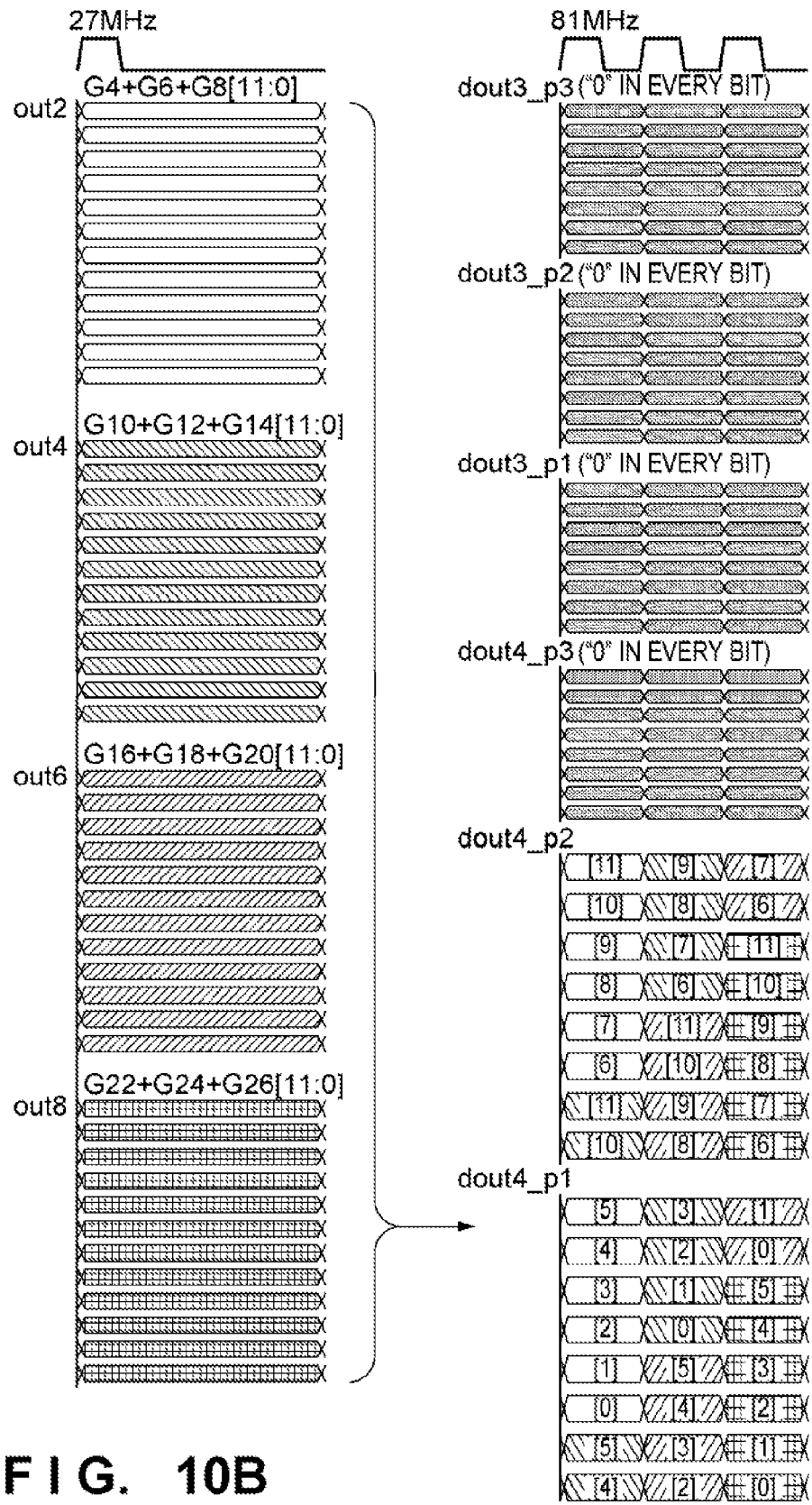

Next, exemplary processing performed by the first data conversion unit 122 will be described with reference to FIGS. 10A and 10B. As described previously, the first data conversion unit 122 receives input of eight pieces of 12-bit parallel data per clock at a rate of 27 MHz. Thus, the first data conversion unit 122 converts the bit width of the input data into 8 bits. The first data conversion unit 122 also converts the output rate into 81 MHz, which is three times the input rate, so that the output rate thereof coincides with the output rate of the second data conversion unit 123. As a result of the bit-width conversion, 8 pieces of 12-bit parallel data are converted into 12 pieces of 8-bit parallel data. Furthermore, since the output rate is three times the input rate, four pieces of 8-bit parallel data are to be output per clock. In the example shown in FIGS. 10A and 10B, the bits of the 12-bit digital data piece representing the three pixels R1, R3, and R5, which has been input as "out1", are distributed 6 bits each to the higher order bits of the data pieces "dout1_p1" and "dout1_p2", which are to be output in the first clock cycle. The bits of the data pieces "out2" to "out8" are also distributed to the bits of one of the data pieces "dout1_p1" to "dout4_p3", which are to be transmitted over three clock cycles, as shown in FIGS. 10A and 10B. The conversion result is, for example, as follows:

dout1_$p$1[7:0] in the first clock cycle={out1[5:0], out3[5:4]} dout1_$p$1[7:0] in the second clock cycle={out3[3:0], out5[5:2]} dout1_$p$1[7:0] in the third clock cycle={out5[1:0], out7[5:0]}

The first data conversion unit 122 outputs four pieces of digital data per clock. Thus, no data needs to be output as the data pieces "dout1_p3", "dout2_p1" to "dout2_p3", "dout3_p1" to "dout3_p3", and "dout4_p3". Thus, the first data conversion unit 122 outputs "Low" ("0s" are displayed in FIGS. 10A and 10B) as these data pieces. In general, the first data conversion unit 122 generates L pieces of P-bit parallel data by rearranging the bits of J pieces of M-bit parallel data.

Figure 11A:
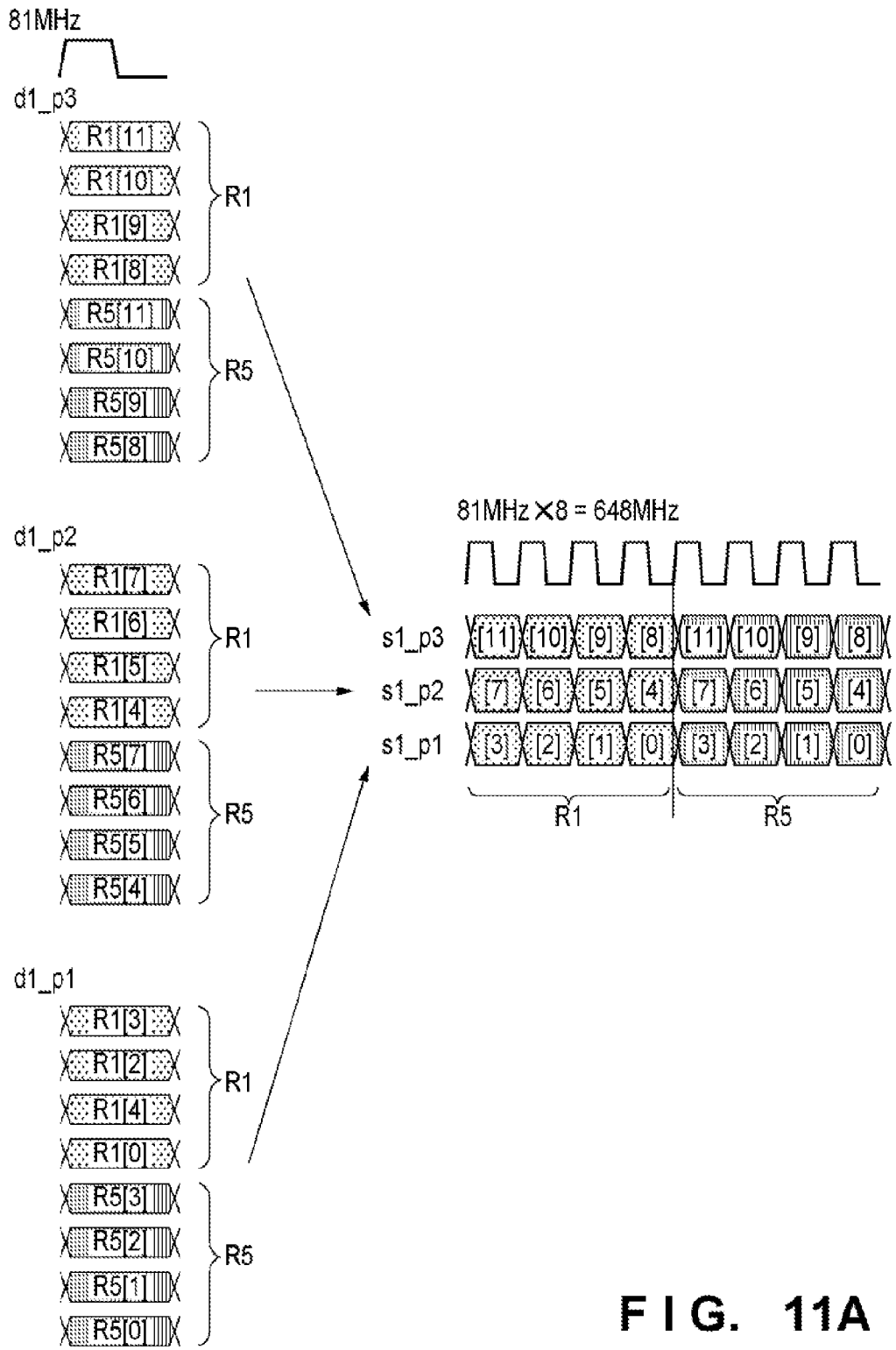
FIGS. 11A to 11D and 12A and 12B are diagrams illustrating an exemplary operation performed in a normal mode by a PS conversion unit 125 according to an embodiment of the present invention.
Figure 11B:
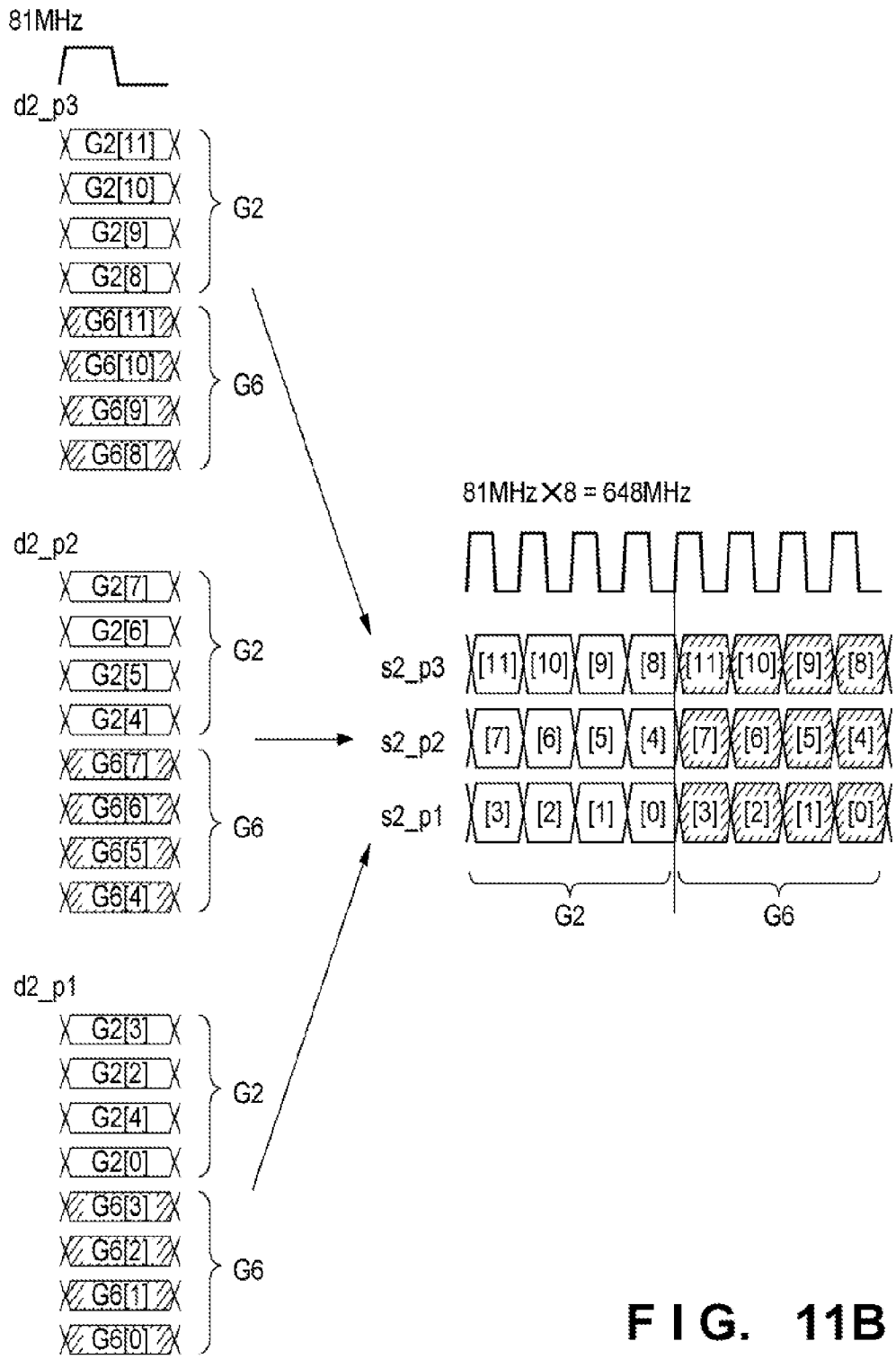
Figure 11C:
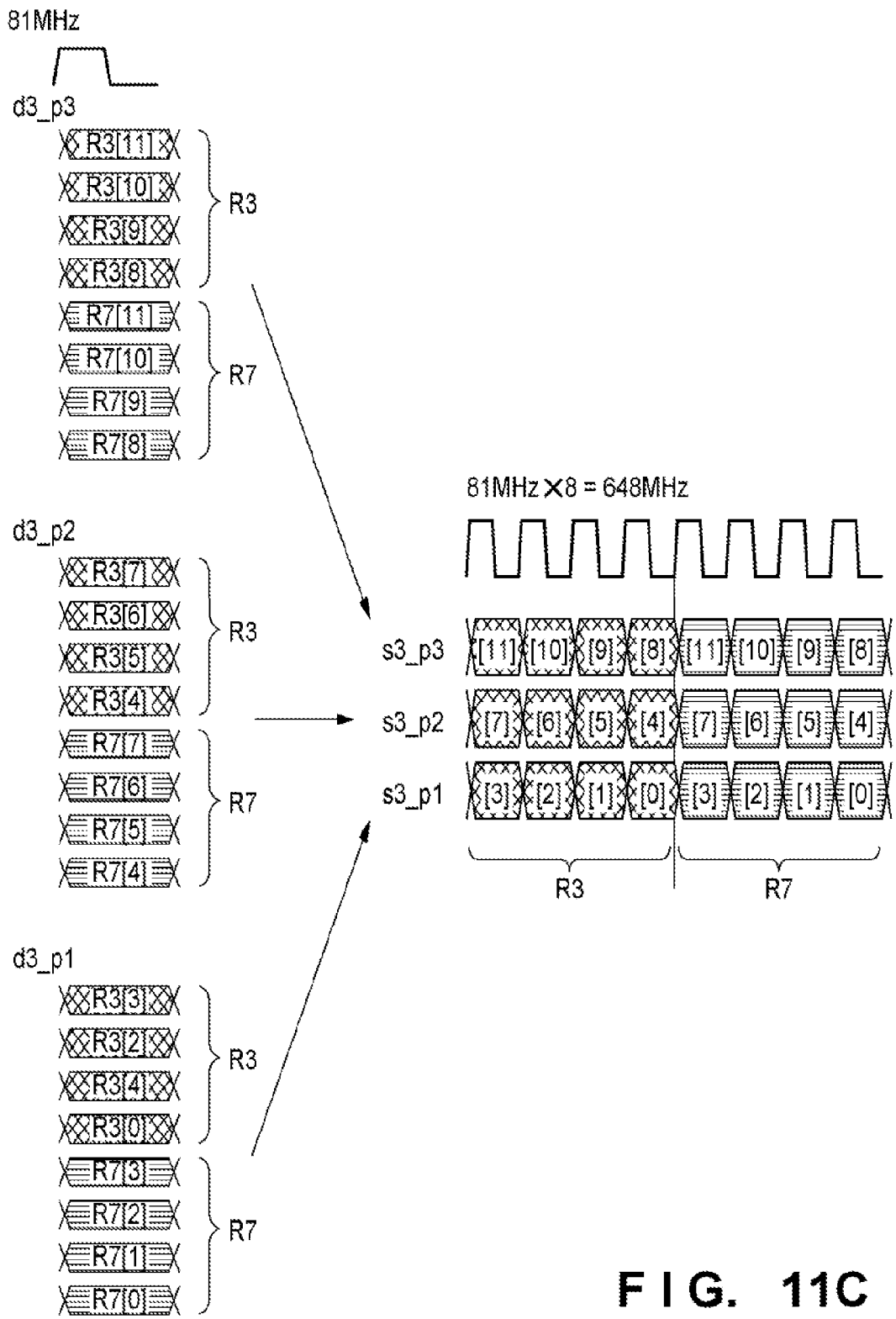
Figure 11D:
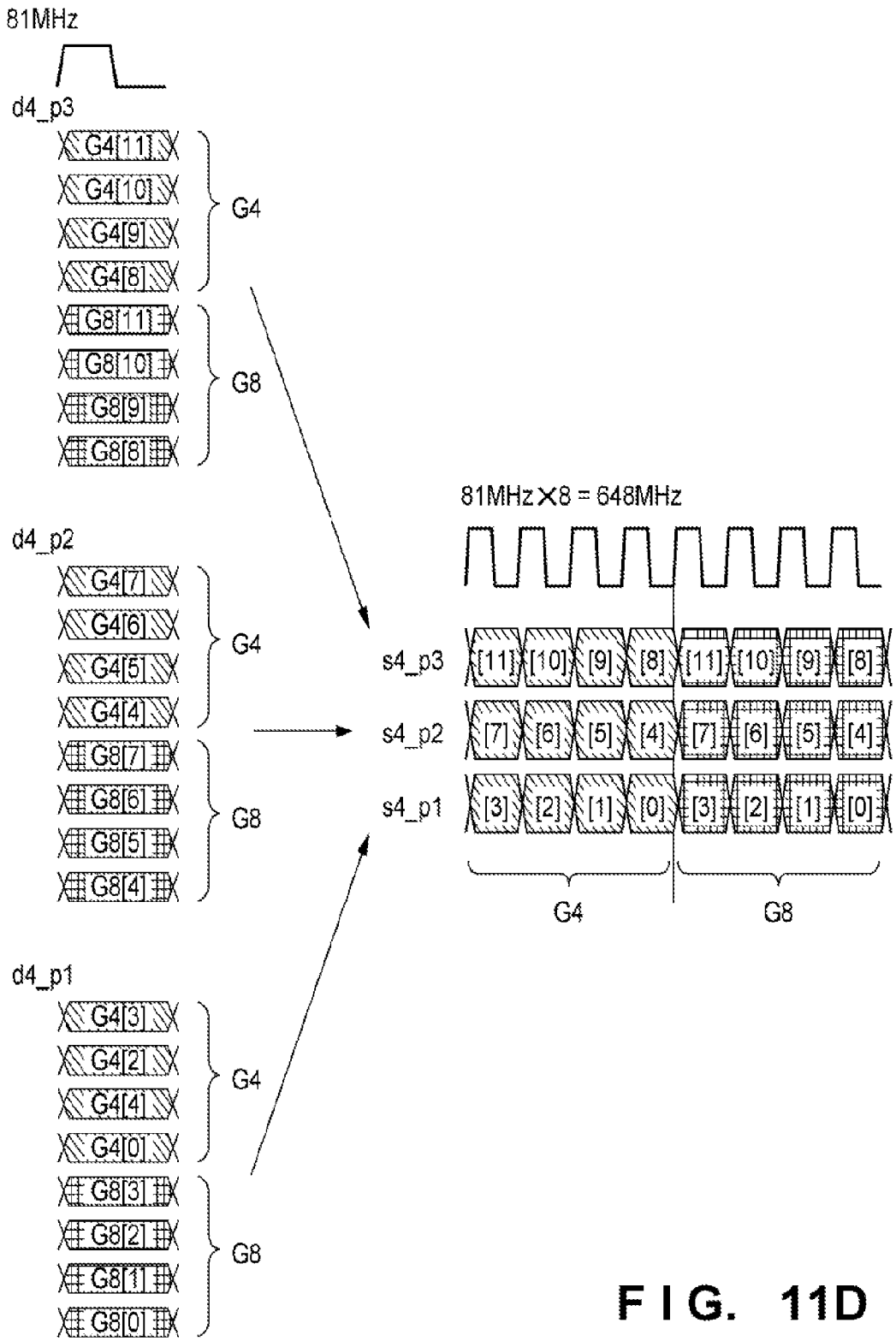

Next, an exemplary operation performed in the normal mode by the PS conversion unit 125 will be described with reference to FIGS. 11A to 11D. As described previously, the PS conversion unit 125 receives input of 12 pieces of 8-bit parallel data per clock at a rate of 81 MHz. The PS conversion unit 125 converts these parallel data pieces into serial data pieces and outputs 12 pieces of 1-bit serial data per clock at a rate of 648 MHz. For example, as shown in FIG. 11A, the PS conversion unit 125 outputs the digital data that has been input as "d1_p3", as the data piece "s1_p3", each bit in each clock cycle in order starting from the highest order bit. As a result, as the data piece "s1_p3", the 11th to 8th bits of the digital data representing the pixel R1 are output first and then the 11th to 8th bits of the digital data representing the pixel R5 are output. The other input data pieces are also converted into serial data pieces in a similar manner. Consequently, for example as shown in FIG. 11A, the digital data representing the pixel R1 is output as the data pieces "s1_p1" to "s1_p3", which are output in the first to fourth clock cycles. In this way, in the normal mode, when reading out the pixels in the first row, the pixel values representing red are output from the ports "s1_p1" to "s1_p3" and "s3_p1" to "s3_p3". Furthermore, the pixel values representing green are output from the ports "s2_p1" to "s2_p3" and "s4_p1" to "s4_p3".

Figure 12A:
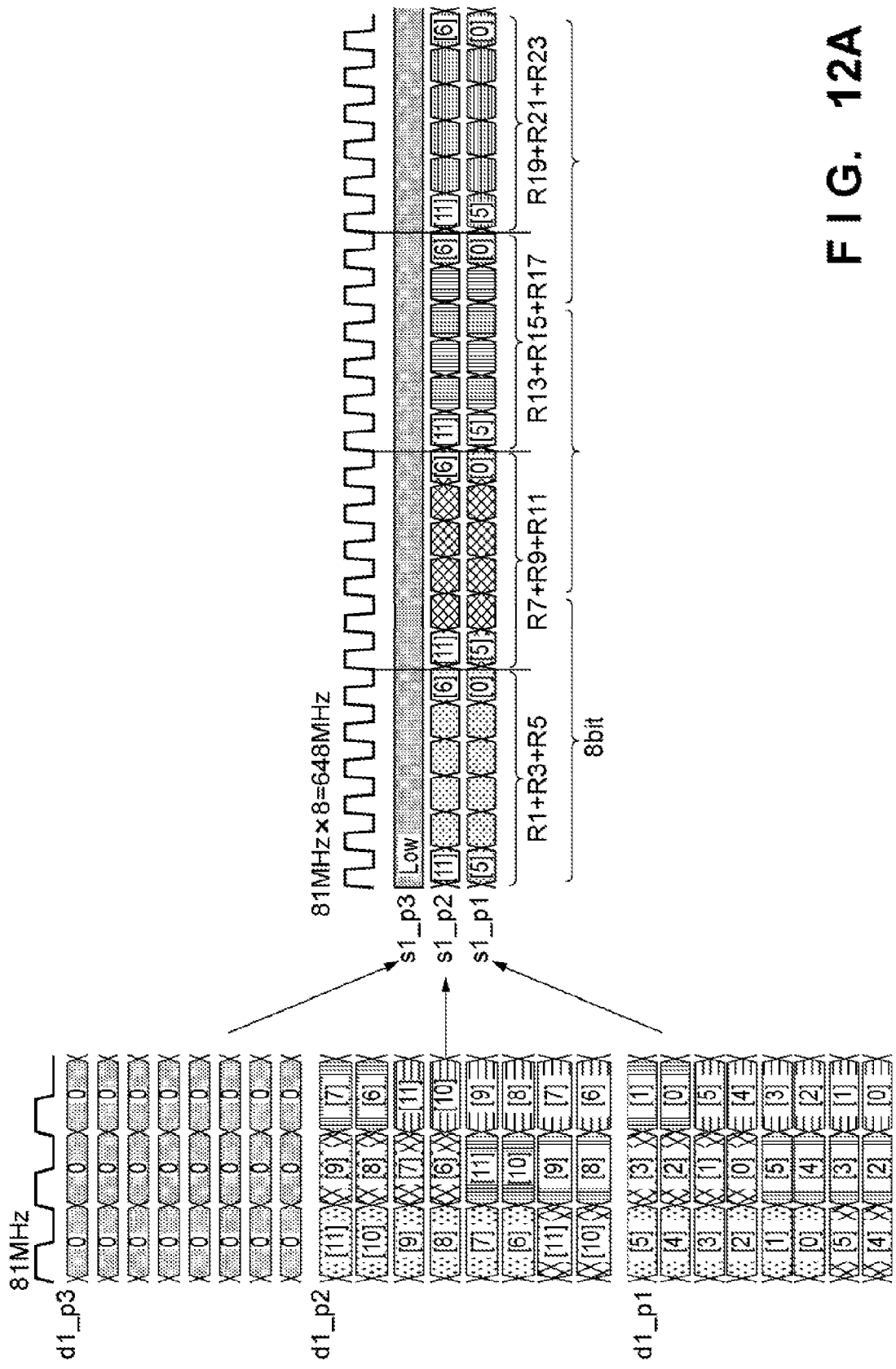
Figure 12B:
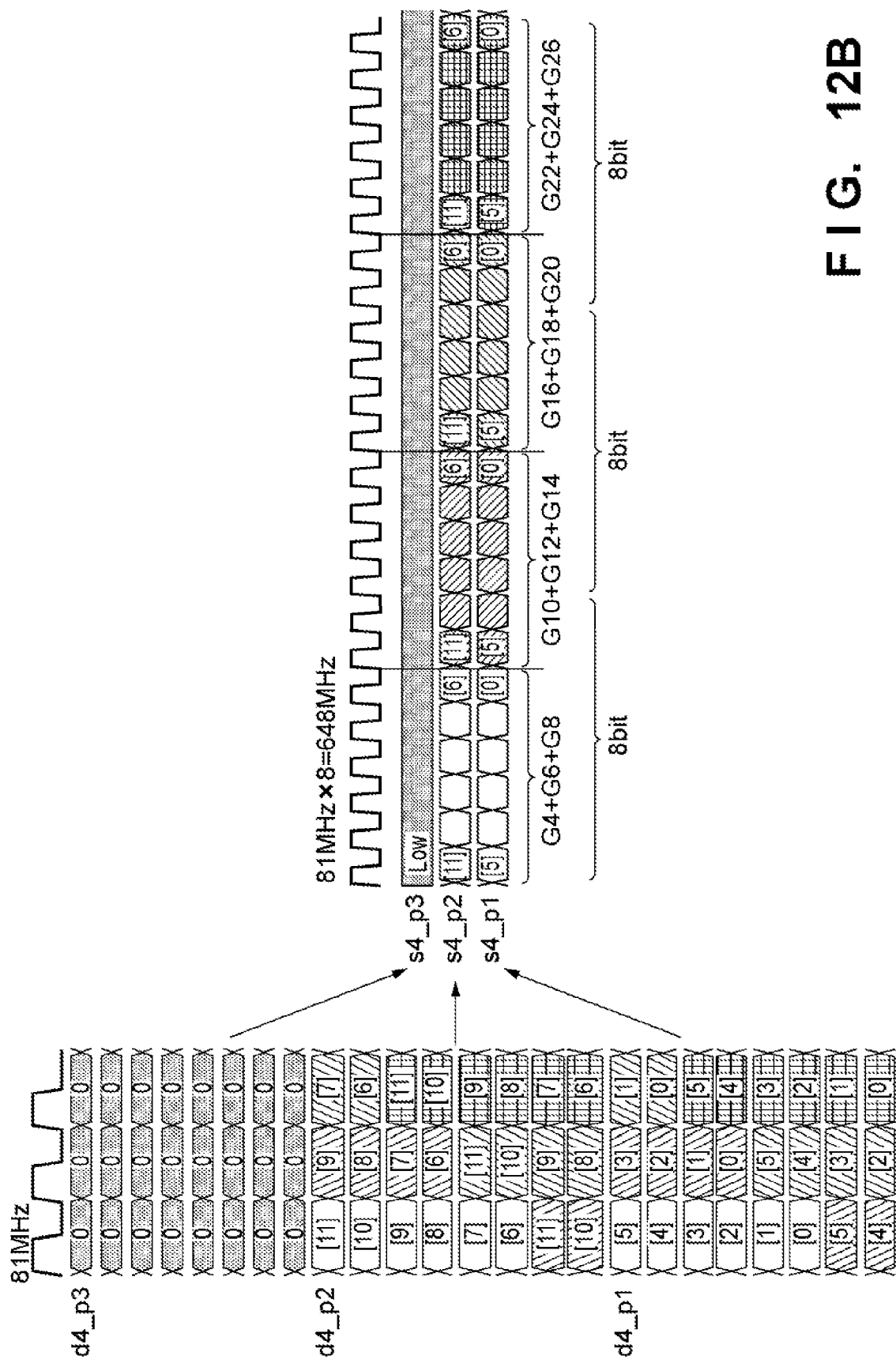

Next, an exemplary operation performed in the compression mode by the PS conversion unit 125 will be described with reference to FIGS. 12A and 12B. However, because a difference between the normal mode and the compression mode lies only in the values of data to be input to the PS conversion unit 125 and the operation itself of the PS conversion unit 125 is the same, descriptions thereof have been omitted. As a result of the conversion by the PS conversion unit 125, for example as shown in FIG. 12A, the digital data representing the three pixels R1, R3, and R5 is output as the data pieces "s1_p1" and "s1_p2", which are output in the first to sixth clock cycles. In the compression mode, "Low" is constantly input as the data pieces "d1_p3", "d2_p1" to "d2_p3", "d3_p1" to "d3_p3", and "d4_p3". Thus, the PS conversion unit 125 outputs "Low" as the data pieces "s1_p3", "s2_p1" to "s2_p3", "s3_p1" to "s3_p3", and "s4_p3". In this way, in the compression mode, when reading out the pixels in the first row, the pixel values representing red are output from the ports "s1_p1" and "s1_p2", and the pixel values representing green are output from the ports "s4_p1" and "s4_p2". Then, "Low" is output from the other ports. In other words, in both of the normal mode (first mode) and the compression mode (second mode), digital data of pixels representing red (digital data of a first color) is output from the ports "s1_p1" and "s1_p2" (first port). Furthermore, in both of the normal mode and the compression mode, digital data of pixels representing green (digital data of a second color) is output from the ports "s4_p1" and "s4_p2" (second port). This eliminates the need for a subsequent signal processing unit to switch the color to be processed depending on the mode, thus making it easy to process input data.

Next, an exemplary detailed arrangement of the transmission unit 130 will be described with reference to FIG. 13. The transmission unit 130 includes 12 low voltage differential signaling (LVDS) circuits that function as output drivers, and the serial data pieces "s1_p1" to "s4_p3" that have been input to the transmission unit 130 are supplied to the respective LVDS circuits. The LVDS circuits each convert the supplied serial data into an LVDS signal and output the LVDS signal to the signal line 170.

As described above, data is transferred from the conversion unit 120 to the transmission unit 130 via the 12 signal lines. Although in the normal mode data is transferred using all of the 12 signal lines, the compression mode uses only four of the 12 signal lines for data transfer. Thus, in the compression mode, the power sources of the LVDS circuits that do not perform data processing are turned off by switching an add and signal to High. In the above-described example, the power sources of eight LVDS circuits can be turned off in the compression mode. As a result, the power consumption of the transmission unit 130 in the compression mode can be reduced to one-third that in the normal mode. Since the power consumption of the transmission unit 130 is higher than those of the other components in the solid-state imaging device 100, the reduction in the power consumption of the transmission unit 130 contributes greatly to a reduction in the power consumption of the solid-state imaging device 100 as a whole. Furthermore, the PS conversion unit 125 may be configured to be able to stop operation for each of the 12 signal lines. Then, PS conversion operations corresponding to signal lines that are not used in the compression mode may be stopped. This may be realized by, for example, stopping clocks used in the PS conversion unit 125. In this case, the power consumption of the PS conversion unit 125 in the compression mode can also be reduced to one-third that in the normal mode.

Furthermore, as shown in FIG. 13, the transmission unit 130 may be configured such that LVDS circuits that are not used in the compression mode may be disposed between LVDS circuits that are used in the compression mode. In the example in FIG. 13, LVDS circuits that are not used in the compression mode are disposed between the LVDS circuit to which the serial data piece "s4_p2" is supplied and the LVDS circuit to which the serial data piece "s1_p1" is supplied. By distributing the LVDS circuits to be used in the compression mode in this way, heat generated by the LVDS circuits can be dispersed. As a result, it is possible to reduce the possibility that part of the transmission unit 130 may be overheated.

Furthermore, like the numerical values given in the above-described example, various parameters may be set such that in both of the normal mode and the compression mode, signals are constantly output from the respective output lines of the transmission unit 130. First, parameters to be used in the solid-state imaging device 100 are defined as follows:

K is the number of pixels to be read out from the imaging unit 110 per clock;

L is the number of the signal lines 170 through which the transmission unit 130 outputs LVDS signals;

M is the resolution of the AD conversion units 112. The AD conversion units 112 represent a pixel value as M-bit digital data; and N is the compression rate. The compression unit 121 outputs a single piece of digital data from digital data pieces of N pixels.

When the parameters are defined as above, conditional expressions for the transmission unit 130 to output bits without gaps are as follows:

Condition 1: (K×M)/L is a natural number; and
Condition 2: (K×M)/N is a natural number.

Here K×M represents the total number of bits to be input to the conversion unit 120 per clock. Thus, in order for the transmission unit 130 to output bits without gaps in the normal mode, the total number of bits needs to be divisible by the number L of signal lines, from which Condition 1 is obtained. Next, (K×M)/N represents the total number of bits per clock in the compression mode. Thus, in order for the transmission unit 130 to output bits without gaps in the compression mode, the total number of bits also needs to be a natural number, from which Condition 2 is obtained. By outputting bits without gaps, the number of the signal lines 170 can be minimized in both of the normal mode and the compression mode. In the compression mode, the number of LVDS circuits that can be turned off can be maximized, and accordingly the power consumption of the transmission unit 130 in the compression mode is minimized. In this case, the number of LVDS circuits to be turned on in the compression mode can be expressed by L/N. In the above-described example, since K=8, L=12, M=12, and N=3, both of the above conditions are satisfied, and it can be understood that it is sufficient for four LVDS circuits to be turned on.

Figure 14:
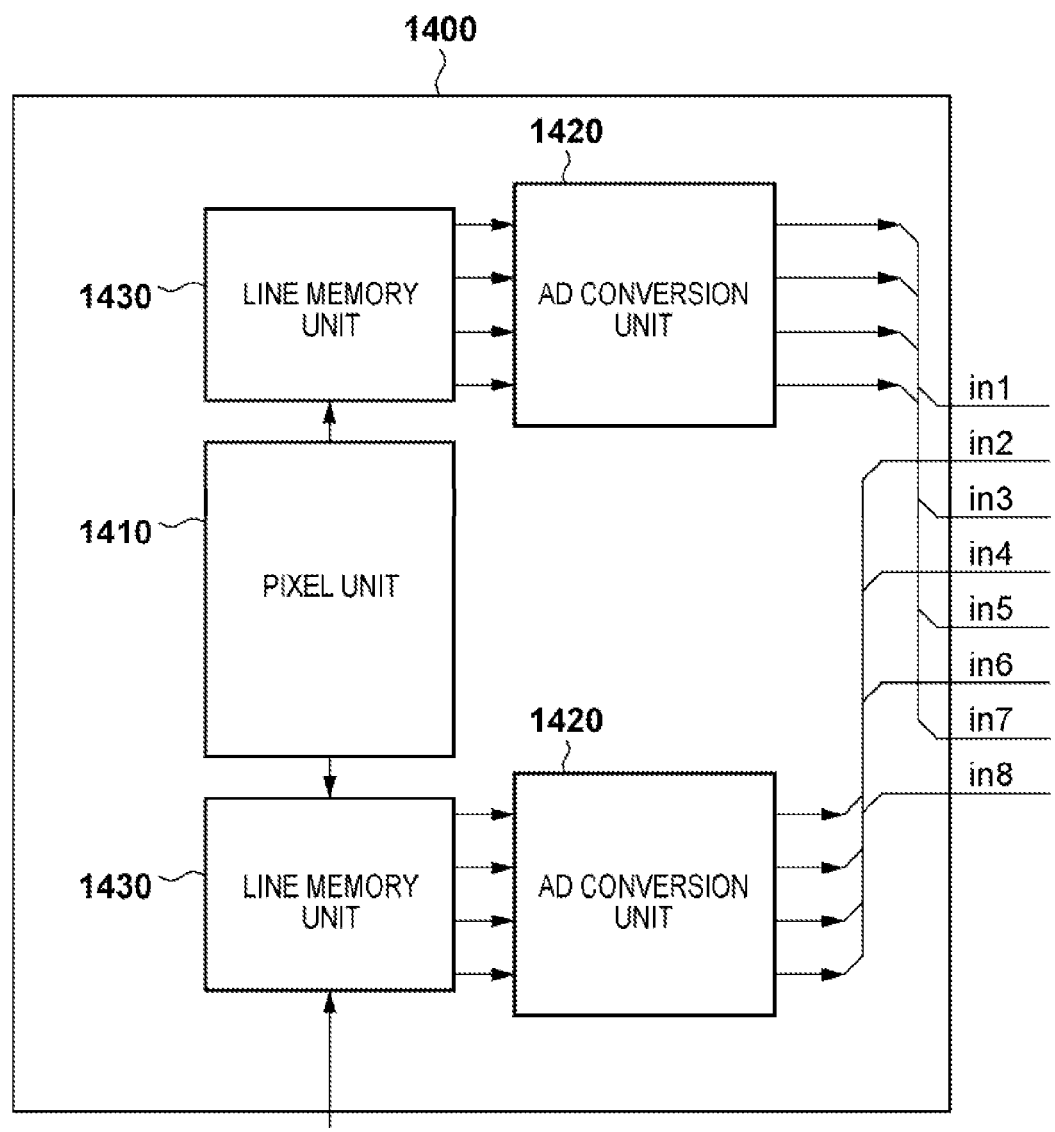
FIG. 14 is a diagram illustrating an exemplary arrangement of an imaging unit 1400 according to an embodiment of the present invention.

Next, a variation of the imaging unit 110 in FIG. 1 will be described with reference to FIG. 14. In some embodiments of the present invention, the solid-state imaging device 100 in FIG. 1 may include an imaging unit 1400 shown in FIG. 14, instead of the imaging unit 110. Like the imaging unit 110, the imaging unit 1400 may also include a pixel unit 1410, AD conversion units 1420, and line memory units 1430. The arrangements of the pixel unit 1410, the AD conversion units 1420, and the line memory units 1430 are the same as those of the pixel unit 111, the AD conversion units 112, and the line memory unit 113, but the arrangement of these units in the imaging unit 1400 is different from that in the imaging unit 110. Analog data pieces output from the pixel unit 1410 are temporarily held in the line memory units 1430. The analog data pieces stored in the line memory units 1430 are output eight pieces per clock to the AD conversion units 1420, and then the AD conversion units 1420 convert the analog data pieces into digital data pieces. These digital data pieces are output as the data pieces "in1" to "in8" to the conversion unit 120.

Next, a circuit arrangement of the compression unit 121 when high-speed driving is performed by reducing the amount of data through thinning of signals will be described with reference to FIG. 15. In this case, the compression unit 121 generates a single piece of digital data from three pieces of digital data each representing a pixel value, and outputs the single piece of digital data to the first data conversion unit 122. FIG. 16 shows the input and output rates of the compression unit 121 when performing thinning processing. Even in the case involving thinning processing, the output rate of the compression unit 121 becomes one-third the input rate thereof as in the case involving addition processing described with reference to FIG. 8.

Next, an embodiment in which the above-described solid-state imaging device 100 is applied to an imaging system 2200 will be described with reference to FIG. 17. The imaging system 2200 is, for example, a camera, and includes the solid-state imaging device 100 described in the above-described embodiment. The imaging system 2200 may further include an optical system 2210, a signal processing unit 2220, a CPU 2230, a switching unit 2240, a video display unit 2250, and an image recording unit 2260. The solid-state imaging device 100 outputs LVDS signals to the signal line 170 as described previously in accordance with light incident from the optical system 2210. The output LVDS signals are subjected to image correction performed by the signal processing unit 2220 so as to be capable of being output to the video display unit 2250 and the image recording unit 2260. The image signals that have undergone signal processing are, for example, displayed in the video display unit 2250 and recorded in the image recording unit 2260. When the operation mode is switched by the operation of the switching unit 2240, this information is input to the CPU 2230, and the CPU 2230 changes control to be performed on the optical system 2210, the solid-state imaging device 100, the signal processing unit 2220, the video display unit 2250, and the image recording unit 2260.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-128640, filed Jun. 8, 2011, which is hereby incorporated by reference herein in its entirety.

What is claimed is:

1. An imaging device comprising:
    an imaging unit configured to output, as digital data, a pixel value indicating one of a plurality of colors including a first color and a second color, for each of a plurality of pixels arranged in an array; and
    a conversion unit configured to output, from a plurality of ports, I pieces of the digital data that has been input from the imaging unit in a first mode, and output, from part of the plurality of ports, J (J<I) pieces of digital data obtained from the I pieces of the digital data of the same color that has been input from the imaging unit in a second mode, wherein
    the part of the ports includes a first port and a second port, and
    when outputting digital data of pixels of a single row in the imaging unit in the first mode and the second mode, the conversion unit outputs digital data of the first color from the first port and outputs digital data of the second color from the second port.

2. The device according to claim 1, further comprising a transmission unit configured to convert a transmission format of digital data that has been output from the plurality of ports, and output the converted digital data to a signal processing unit.

3. The device according to claim 2, wherein
    the transmission unit includes, for each of the plurality of ports, a conversion circuit configured to convert the transmission format of digital data that has been output from the port,
    a conversion circuit that corresponds to a port that is not used in the second mode among the plurality of ports is disposed between a conversion circuit that corresponds to the first port and a conversion circuit that corresponds to the second port, and
    the conversion circuit that corresponds to the port that is not used in the second mode is off during the second mode.

4. The device according to claim 2, wherein
    the conversion circuits include LVDS circuits, and
    the conversion circuits convert digital data that has been output from the ports into LVDS signals.

5. The device according to claim 1, wherein
    the imaging unit outputs the digital data of the pixel value as M-bit parallel data,
    the conversion unit includes:
        a compression unit configured to provide the J pieces of M-bit parallel data from the I pieces of the M-bit parallel data;
        a first data conversion unit configured to generate L pieces of P-bit parallel data by rearranging bits of the J pieces of the M-bit parallel data that has been input from the compression unit;
        a second data conversion unit configured to generate Q pieces of P-bit parallel data by rearranging bits of the I pieces of the M-bit parallel data that has been input from the imaging unit; and
        a PS conversion unit configured to, in the first mode, convert the P-bit parallel data received from the second data conversion unit into serial data and output the serial data from the plurality of ports, and in the second mode, convert the P-bit parallel data received from the first data conversion unit into serial data and output the serial data from the part of the ports.

6. The device according to claim 1, wherein, in the second mode, the conversion unit adds up or averages digital data of a plurality of the pixel values, or acquires a largest or smallest value from digital data of a plurality of the pixel values.

7. An imaging system comprising:
    an imaging device according to claim 1; and
    a signal processing unit configured to process a signal that has been output from the imaging device.

* * * * *